US006562473B1

(12) United States Patent
Okabe et al.

(10) Patent No.: US 6,562,473 B1
(45) Date of Patent: May 13, 2003

(54) ELECTRICAL STEEL SHEET SUITABLE FOR COMPACT IRON CORE AND MANUFACTURING METHOD THEREFOR

(75) Inventors: Seiji Okabe, Okayama (JP); Yasuyuki Hayakawa, Okayama (JP); Takeshi Imamura, Okayama (JP); Mitsumasa Kurosawa, Okayama (JP)

(73) Assignee: Kawasaki Steel Corporation, Hyogo (JP)

( * ) Notice: Subject to any disclaimer, the term of this patent is extended or adjusted under 35 U.S.C. 154(b) by 94 days.

(21) Appl. No.: 09/722,017

(22) Filed: Nov. 27, 2000

(30) Foreign Application Priority Data

| | | |
|---|---|---|
| Dec. 3, 1999 | (JP) | 11-344229 |
| Dec. 6, 1999 | (JP) | 11-345995 |
| Dec. 22, 1999 | (JP) | 11-364613 |

(51) Int. Cl.[7] .................... B32B 15/04; H01F 1/04

(52) U.S. Cl. .................... 428/469; 148/306; 148/307; 148/308; 148/310; 148/100; 148/110; 148/111; 148/112; 148/120; 148/121; 427/409; 427/419.5; 427/419.6; 428/432; 428/900; 428/928

(58) Field of Search .................... 428/469, 432, 428/900, 928; 148/306, 307, 308, 310, 100, 110, 111, 112, 120, 121; 427/409, 419.5, 419.6

(56) References Cited

U.S. PATENT DOCUMENTS

| | | | | |
|---|---|---|---|---|
| 3,856,568 A | | 12/1974 | Tanaka et al. | |
| 5,512,110 A | | 4/1996 | Yoshitomi et al. | |
| 5,653,821 A | | 8/1997 | Choi et al. | |
| 5,858,126 A | * | 1/1999 | Takashima et al. | 148/308 |

FOREIGN PATENT DOCUMENTS

| | | |
|---|---|---|
| EP | 0 318 051 | 5/1989 |
| EP | 0 452 153 | 10/1991 |
| EP | 0 453 284 | 10/1991 |
| JP | 61-266059 | 11/1986 |
| JP | 63-216945 | 9/1988 |

* cited by examiner

*Primary Examiner*—Robert R. Koehler
(74) *Attorney, Agent, or Firm*—Young & Thompson

(57) ABSTRACT

Electrical steel sheets having superior magnetic properties, anti-noise properties, and workability, are ideal for use a compact iron core material in electric apparatuses, such as compact transformers, motors, and electric generators. A totally new electrical steel sheet and a manufacturing method therefor are proposed, in which the electrical steel sheet is not only most advantageous in magnetic properties but also advantageous from economic point of view. That is, the electrical steel sheet of the present invention is composed of from about 2.0 to 8.0 wt % Si, from about 0.005 to 3.0 wt % Mn, from about 0.0010 to 0.020 wt % Al, balance essentially iron. The magnetic flux density $B_{50}(L)$ in a rolling direction and the magnetic flux density $B_{50}(C)$ in the direction perpendicular thereto are 1.70 T or more, and the $B_{50}(L)/B_{50}(C)$ is 1.005 to 1.100. In addition, the secondary recrystallized grains inclined by 20' or less with respect to the {100}<001> orientation are present in the steel sheet at an areal ratio of 50 to 80%, and secondary recrystallized grains inclined by 20° or less with respect to the {110}<001> orientation are present in the steel sheet at an areal ratio of 6 to 20%.

24 Claims, 14 Drawing Sheets

ELECTRICAL STEEL SHEET SUITABLE FOR COMPACT IRON CORE AND MANUFACTURING METHOD THEREFOR

BACKGROUND OF THE INVENTION

1. Field of the Invention

The present invention relates to electrical steel sheets having superior magnetic properties, anti-noise properties, and workability, which are suitably used as compact iron core materials primarily for use in compact transformers, motors, electric-generators, and the like. The invention also relates to methods for manufacturing such electrical steel sheets.

2. Description of the Related Art

Compact iron core materials in electric apparatuses are mainly required to have superior magnetic properties. In addition, superior anti-noise properties or superior workabilities are desired.

Magnetic properties will first be described. Magnetic properties are greatly influenced by the orientations of crystalline grains constituting steel sheets. Among the directions mentioned above, it has been well known that, in order to obtain superior magnetic properties, the <001> axes, i.e., the axes of easy magnetization of crystalline grains, should be parallel with the surface of the steel sheet.

The following types of steel sheet are conventionally used for iron cores in compact electric apparatus: (1) a general-purpose cold-rolled steel sheet or a decarburized steel thereof, (2) a non-oriented silicon steel sheet in which the iron loss is decreased by adding silicon (Si) and by decreasing impurities; (3) a singly oriented silicon steel sheet in which crystalline grains are preferentially grown having the Goss orientations, i.e., the {110}<001> orientation, by using secondary recrystallization; and (4) a doubly oriented silicon steel sheet in which crystalline grains are preferentially grown having the cube orientations, i.e., the {100}<001> orientation.

Among the steel sheets described above, the general-purpose cold-rolled steel sheet, the decarburized steel sheet thereof, and the non-oriented silicon steel sheet have a smaller number of crystalline grains in the surface thereof having the <001> axes in parallel with each other since the evolution of the texture is insufficient. Accordingly, compared to the singly oriented silicon steel sheet, superior magnetic properties cannot be obtained.

The singly oriented silicon steel sheet is most generally used for iron core materials for transformers. In the singly oriented silicon steel sheet composed of crystalline grains integrated in the Goss orientations, the <001> axes, which are easily magnetized, are highly integrated in a rolling direction. Consequently, in particular, when magnetization is performed in the rolling direction, superior magnetic properties can be obtained. However, the <111> axes, which are most difficult to magnetize, are present in the surface of the steel sheet. As a result, when magnetization is performed in the direction of the axes described above, the magnetic properties are extremely inferior. That is, singly oriented silicon steel sheets are advantageously used for applications, such as for transformers, which require superior magnetic properties only in one direction. On the other hand, singly oriented silicon steel sheets are not advantageously used for applications, such as for iron core materials for motors and electric generators or the like, which require superior magnetic properties in multiple directions on the surface of the steel sheet.

Methods for manufacturing doubly oriented silicon steel sheets have been researched for many years, in which the cube-oriented texture is grown by secondary recrystallization. For example, a method is disclosed in Japanese Examined Patent Application Publication No. 35-2657, in which the cube-oriented grains are recrystallized by so-called "cross rolling" while using an inhibitor. In the method described above, secondary recrystallization is performed by cross rolling in which cold rolling is performed in one direction followed by cold rolling in the direction perpendicular thereto, annealing for a short period, and annealing at a higher temperature of 900 to 1,300° C. In addition, a method is disclosed in Japanese Unexamined Patent Application Publication No. 4-362132, in which the cube-oriented grains are recrystallized using aluminum nitride (AlN) after cold rolling is performed at a reduction rate of 50 to 90% in the direction perpendicular to hot rolling direction. In the method described above, after cold rolling, annealing is conducted so as to perform primary recrystallization, and final finish annealing is then conducted so as to perform secondary recrystallization and purification.

In the methods performed using recrystallization, steel sheets having cube-oriented texture are obtained in which the <100> axes in the surface thereof are highly integrated in the rolling direction. Accordingly, magnetic properties in the rolling direction and the direction perpendicular thereto are superior. However, as the direction 45° with respect to the rolling direction is the <110> axes orientation, which is difficult to magnetize, the magnetic properties in this direction are inferior.

In the steel sheets having the {100} orientations in the rolling surfaces thereof, a number of the easily magnetized axes <100> are present in the rolling surface, and the difficult magnetization axes <111> are not present. Accordingly, compared to the steel sheets conventionally used, the steel sheets having the {100} orientations in the rolling surfaces can be advantageously used for applications which require superior magnetic properties in every direction in the surfaces thereof. In particular, in the steel sheet composed of crystals having the {100}<uvw> orientations in which the rolling surface is in parallel with the {100}orientation, and the <001> axes are randomly aligned in the rolling surface, ansiotropic magnetic properties are not present at all in the rolling surface direction. Therefore, the steel sheets described above are ideal materials for use in motors.

Based on the understanding described above, methods for growing the {100} texture have been attempted. In the present invention, "to grow the {100} texture" means "to increase the number of crystals having the {100} orientations forming a rolling surface."

For example, a method is disclosed in Japanese Examined Patent Application Publication No. 51-942, in which cold rolling is performed at a reduction rate of 85% or more, and more preferably, 90% or more, and after that, prolonged annealing is performed at 700 to 1,2000° C. for 1 minute to 1 hour. However, in the method described above, even though the {100} texture is grown immediately after rolling is complete, the {111} texture is also grown after prolonged annealing for recrystallization is performed. As a result, the product thus formed cannot is have superior magnetic properties.

In addition, a method is disclosed in Japanese Examined Patent Application Publication No. 57-14411, in which, after cold rolling is complete, a cooling rate is controlled in the phase transition region from a $\gamma$ phase to an $\alpha$ phase during recrystallization. However, in the method described above, since a γ transformation must occur during recrystallization, the content of Si, which stabilizes the α phase, cannot be increased. For example, when carbon (C) and manganese (Mn) are not contained, the γ transformation will not occur when the content of Si is approximately 2 wt % or more, whereby the method cannot be used. That is, the method described above is a disadvantageous method since the content of Si cannot be increased, which also advantageously works to decrease an iron loss.

Furthermore, a method is disclosed in Japanese Unexamined Patent Application Publication No 5-5126, in which a steel containing 0.006 to 0.020 wt % C is cold rolled, is recrystallized by heating to 900 to 1,000° C., and is subsequently processed by recrystallization annealing. The steel sheet thus obtained according to Example 1 in the same publication described above has a magnetic flux density $B_{50}$ of approximately 1.66 to 1.68 T, which is an average of the values obtained in the rolling direction and the direction perpendicular thereto. That is, the <001> axes in the surface of the steel sheet are not so highly integrated.

As described above, conventional methods for manufacturing non-oriented silicon steel sheets do not sufficiently grow the {100} texture, Consequently, the magnetic properties cannot be sufficiently improved.

FIG. 1 shows an EI core, which is a typical shape of a compact transformer formed of laminated steel sheets.

As an iron core material used for the EI core, both non-oriented silicon steel sheets and singly oriented silicon steel sheets are presently used.

When a non-oriented silicon steel sheet is used, compared to the case in which a singly oriented silicon steel sheet is used, the magnetic properties of the core are inferior thereto. The reason for this is that the magnetic properties of a non-oriented silicon steel sheet are inferior to those of a singly oriented silicon steel sheet. However, compared to a singly oriented silicon steel sheet, a non-oriented silicon steel sheet is used from an economic point of view, since it can be produced by a simpler manufacturing process and is lower in cost.

In contrast, a singly oriented silicon steel sheet has superior magnetic properties in the rolling direction but has extremely inferior magnetic properties in the direction perpendicular thereto. When a singly oriented silicon steel sheet is used as an iron core material for the EI core, the flow of magnetic flux is both in the rolling direction and the direction perpendicular thereto. Compared to a non-oriented silicon steel sheet, the magnetic properties of the core composed of a singly oriented silicon steel sheet is superior; however, the singly oriented silicon steel sheet is not advantageously used.

It is believed that a doubly oriented silicon steel sheet, which has superior magnetic properties in both the rolling direction and the direction perpendicular thereto, is most advantageous. However, in the conventional methods, cross rolling is required for manufacturing a doubly oriented silicon steel sheet, such that production yield is extremely low. Such products have not been made on an industrial mass production scale. In addition, in iron cores used for compact transformers, such as an EI core, a portion at which the flow of magnetic flux changes orthogonally will have significant influence. In other words, a doubly oriented silicon steel sheet cannot be an ideal material, since the magnetic properties in the direction oriented 45° away from the rolling direction are inferior.

As described above, the conventional methods do not produce an ideal iron core material, such as an EI core in compact transformers.

Next, anti-noise properties will be described. Recently, especially considering environmental issues, concomitant with even more strict regulations for controlling noise, noise generated by transformers and the like is increasingly a serious problem. Accordingly, reduction in noise generated by transformers is an essential requirement therefor.

Consequently, manufacturers of transformers are very interested in magnetostriction properties, which are considered to be a major reason for generating noise, and have requested material manufacturers to decrease the noise generation. As a result, in order to respond to the requirements described above, the material manufacturers have made intensive efforts to reduce magnetostriction of electrical steel sheets.

It is believed that magnetostriction is caused by, when a steel sheet is magnetized, movement of 90° magnetic domain walls and a rotating magnetization. Consequently, magnetostriction is effectively reduced when 90° magnetic domains are decreased.

In singly oriented silicon steel sheets, by enhancing orientations of crystalline grains using an inhibitor or the like, reduction in magnetostriction, in addition to improvement in magnetic properties, is achieved. The reduction in magnetostriction is achieved by increasing 180° magnetic domains and by decreasing 90° magnetic domains.

In order to further reduce magnetostriction, a method is conventionally employed in which a film or an insulating coating, which can impart tensile force, is used. The method described above is a method exploiting a phenomenon in which, when tensile force is provided to a steel sheet, the widths of 180° magnetic domains are decreased, and 90° magnetic domains are decreased. That is, this method is a method in which an insulating coating is formed on a steel sheet by baking at a higher temperature, and tensile force is imparted to the steel sheet by using a difference in coefficients of thermal expansion between the steel sheet and the insulating coating, whereby the magnetostriction is reduced.

For example, a method for forming a tensile coating composed of colloidal silica, aluminum phosphate, and chromic anhydride is disclosed in Japanese Examined Patent Application Publication No. 53-28375. In addition, a method is disclosed in Japanese Examined Patent Application Publication No. 5-77749, in which at least one thin film of TiC, TiN, and Ti(C,N) is adhered to a steel sheet so as to impart tensile force thereto. However, since most of the tensile films and tensile coatings are composed of glass materials or ceramic materials, there are problems in that they are brittle and are easily separated during stamping. As a result, the methods described above can be applied only to singly oriented silicon steel sheets in which almost no stamping properties are required, and in practice, the methods described above cannot be applied to electrical steel sheets in which stamping properties are essential.

A phenomenon is known in which, when the content of Si in a Fe—Si alloy is close to 6 wt %, the magnetostriction constants $\lambda_{100}$ and $\lambda_{111}$ are nearly zero, and magnetostriction will not occur. By exploiting the phenomenon described above, in order to improve magnetostriction properties, a method of increasing the content of Si is attempted.

For example, a method is disclosed in Japanese Unexamined Patent Application Publication No. 62-227078, in which Si is impregnated in a steel sheet containing less than 4 wt % Si, and Si is diffused in the sheet thickness direction, thereby yielding a high silicon steel sheet. However, when the content of Si in a steel sheet is increased, the fabrication properties of the steel sheet are extremely degraded. As a result, the method described above is difficult to apply to steel sheets which are formed into iron cores for motors or the like by stamping. Furthermore, in the method described above, impregnation of Si cannot be performed uniformly, and hence, non-uniformity can be observed in the sheet thickness direction, which cannot be ignored. As a result, problems may arise in that magnetic properties and magnetostriction are difficult to control.

In addition, in Japanese Unexamined Patent Application Publication Nos. 9-275021 and 9-275022, methods are disclosed in which low noise iron cores are obtained by setting the absolute value of direct current magnetostriction of non-oriented silicon steel sheets to be $1.5\times10^{-6}$ or less. In the method described above, in order to set the absolute value of direct current magnetostriction of non-oriented silicon steel sheets to be $1.5\times10^{-6}$ or less, it is clearly described that the content of Si is controlled to be 4.0 to 7.0 wt %. However, when Si is contained at a high concentration in a steel sheet as described above, the fabrication properties thereof are extremely degraded. As a result, the method is difficult to apply to steel sheets which are formed into iron cores for motors or the like by stamping.

Finally, workability will be described. In particular, in a steel sheet in which a large number of the cube-oriented grains represented by the Miller index of the {100}<001> is present, it is considered that the workability thereof is extremely degraded. The steel sheet described above is represented by a doubly oriented silicon steel sheet, and the magnetic properties thereof are degraded by fabrication more seriously than those of a singly oriented and a non-oriented silicon steel sheet, that is, the workability is degraded.

The reason for this is that the conventional doubly oriented silicon steel sheet formed by exploiting secondary recrystallization has crystalline grains having diameters significantly larger than those of the non-oriented silicon steel sheets. As a result, edge portions of the conventional doubly oriented silicon steel sheet are likely to deform during cutting and stamping, and hence, larger distortions are likely to be generated. In addition, by finish annealing at a higher temperature, a rigid oxide film primarily composed of forsterite is formed. The rigid film increases the distortions at the edge portions of the steel sheet. As a result, the magnetic properties are degraded by the distortions described above.

In order to solve the problems described above, Japanese Unexamined Patent Application Publication No. 5-275222 proposes that a non-magnetic oxide on a surface is reduced by pickling, polishing, or the like. However, by reducing only a non-metal material on surfaces, insulation properties between steel sheets are degraded. In the method described above, the magnetic flux density is increased; however, the iron loss is also increased, and hence, materials according to the method are not preferably used as iron core materials. In addition, in pickling or polishing, since the oxide may be non-uniformly removed, or since distortion may be newly introduced, the iron loss is degraded.

On the other hand, in a singly oriented silicon steel sheet formed by exploiting secondary recrystallization, similarly to the above, tensile force is imparted to the steel sheet by a forsterite film and a silica-phosphate-based coating. As a result, the influence of distortion is alleviated.

However, when a tensile coating as described above is applied to a doubly oriented silicon steel sheet, magnetic properties in one of the rolling direction (L direction) and the direction perpendicular thereto (C direction) are improved, but magnetic properties in the other direction, which are not improved, are degraded. In polycrystalline doubly oriented silicon steel sheets manufactured in industrial production process, orientations of crystalline grains vary. Accordingly, magnetic properties in only one of the L direction and the C direction, in which the <001> axes are highly integrated, are preferentially improved by a tensile coating, but in contrast, magnetic properties in the other direction are degraded.

The problems relating to the workability of the doubly oriented silicon steel sheets can be applied to a steel sheet in which a ratio of the cube oriented grains is high, according to the mechanism thereof.

As has thus been described, in view of magnetic properties, economic considerations, and the like, there has yet to be manufactured on any commercial scale an electrical steel sheet that is ideal for use as an iron core material in compact electric apparatuses.

SUMMARY OF THE INVENTION

The present invention solves the problems described above. An object of the present invention is to provide a totally new electrical steel sheet in compact iron cores, which has the most desirable magnetic properties and is advantageous in view of economic considerations, and to provide a manufacturing method therefor. In addition, another object of the present invention is to provide an electrical steel sheet having superior anti-noise properties and superior workability in which degradation of the magnetic properties is suppressed which is caused by distortion in fabrication, and to provide a manufacturing method therefor.

According to the present invention, an electrical steel sheet comprises from about 2.0 to about 8.0 wt % Si, from about 0.005 to about 3.0 wt % Mn, from about 0.0010 to about 0.020 wt % aluminum (Al), balance essentially iron, wherein the magnetic flux density $B_{50}(L)$ in the rolling direction and the magnetic flux density $B_{50}(C)$ in the direction perpendicular to the rolling direction are about 1.70 T or more, and the ratio $B_{50}(L)/B_{50}(C)$ is from about 1.005 to about 1.100. In the electrical steel sheet according to present invention, secondary recrystallized grains inclined by 20° or less with respect to the {100}<001> orientation are preferably present in the steel sheet at an areal ratio of 50% to 80%, and secondary recrystallized grains inclined by 20° or less with respect to the {110}<001> orientation are preferably present in the steel sheet at an areal ratio of 6% to 20%. The electrical steel sheet according to the present invention may further comprise at least one member selected from the group consisting of nickel (Ni), tin (Sn), antimony (Sb), copper (Cu), molybdenum (Mo), and chromium (Cr). In order to improve the anti-noise properties, in the electrical steel sheet according to the present invention, the sum of the magnetostrictions in the rolling direction and in the direction perpendicular thereto is preferably set to be $8\times10^{-6}$ or less, and secondary recrystallized grains inclined by 15° or less with respect to the {100}<001> orientation are preferably present in the steel sheet at an areal ratio of 30% to 70%. In order to avoid the degradation of the properties during fabrication, an amount of an oxide formed on the surface of the steel sheet is preferably controlled to be 1.0 g/m$^2$ or less as an amount of oxygen on one surface of the steel sheet apart from an insulating coating, or tensile force of the oxide on the surface of the steel sheet and a coating formed on the steel sheet, which is imparted to the steel sheet, is preferably 5 MPa or less.

In addition, a method for manufacturing an electrical steel sheet according to the present invention, comprises steps of;

hot rolling a steel slab containing from about 0.003 to about 0.08 wt % C, from about 2.0 to about 8.0 wt % Si, from about 0.005 to about 3.0 wt % Mn, and from about 0.0010 to about 0.020 wt % Al; annealing the hot-rolled steel sheet at a temperature of from about 950 to about 1,200° C. when necessary; cold rolling at least once the hot-rolled steel sheet or the annealed steel sheet, in the case in which a cold rolling is performed two times or more, an intermediate annealing is performed therebetween; recrystallization annealing the cold-rolled steel sheet; coating a separator for annealing on the steel sheet processed by the recrystallization annealing step when necessary; final finish annealing the steel sheet processed by the recrystallization annealing to a temperature range of about 800° C. or more; flattening annealing the steel sheet annealed by the final finish annealing step when necessary; and forming a insulating coating on the steel sheet. In addition, in the method for manufacturing the electrical steel sheet according to the present invention, the contents of sulfur (S) and selenium (Se) are preferably controlled to be 100 ppm by weight or less, respectively, the contents of nitrogen (N) and oxygen (O) are preferably controlled to be 50 ppm by weight, respectively, which are unavoidable impurities, the average heating rate is preferably set to be 30° C./hour or less above 750° C. in the final finish annealing step, and the steel slab preferably further comprises at least one member selected from the group consisting of Ni, Sn, Sb, Cu, Mo, and Cr. In order to improve the anti-noise properties, the recrystallization annealing step is preferably performed at a temperature of 800 to 1,000° C. in an atmosphere in which a ratio of nitrogen is 5 vol % or more. In order to avoid degradation of the properties caused by fabrication, it is preferable that the average diameter of crystalline grains be set to be 200 μm or more before a final cold rolling step is performed, the reduction rate in the final cold rolling step be set to be 60 to 90%, and the final finish annealing step be performed at 1,100° C. or less in an atmosphere in which the dew point is 10° C. or less and a volume percentage of oxygen is 0.1% or less. In addition, forming insulating coating step is preferably performed by coating an organic coating material at a thickness of 5 μm or less, a semi-organic coating material, composed of an organic resin and an inorganic component, at a thickness of 5 μm or less, or an inorganic glass coating material at a thickness of 2 μm or less.

DESCRIPTION OF THE PREFERRED EMBODIMENTS

Figure 1:
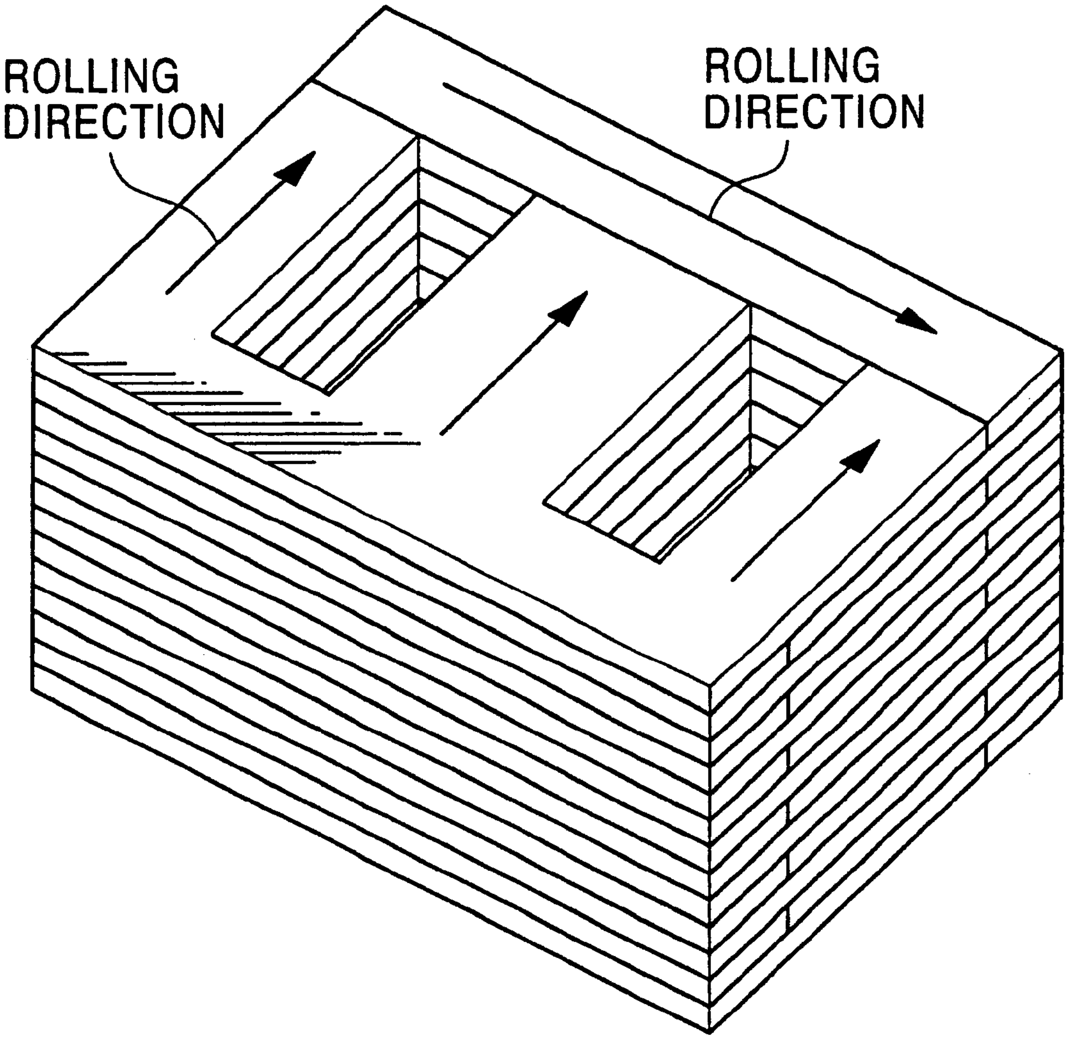
FIG. 1 is a view showing a shape of an EI core.

In order to achieve the objects described above, intensive research was made by the inventors of the present invention. As a result, through the process of trial and error, electrical steel sheets were developed which are especially useful for compact transformers and the like, and hence, the present invention was made.

Hereinafter, experimental results obtained for the present invention will be described, which illustrate the invention, but should not be viewed in a limiting sense.

A steel ingot A was formed by continuous casting, which had a composition of 0.010 wt % C, 2.5 wt % Si, 0.05 wt % Mn, 0.0080 wt % Al, 8 ppm N, 12 ppm O, balance essentially iron, in which an inhibitor was not contained. The slab thus formed was heated to 1,120° C. and was then formed into a hot-rolled steel sheet 2.8 mm thick by hot rolling. The hot-rolled steel sheets were processed by annealing at various constant temperatures for 1 minute in a nitrogen atmosphere and were then quenched. Subsequently, the quenched steel sheets were cold-rolled at 230° C., thereby yielding cold-rolled steel sheets having a final thickness of 0.35 mm. The cold-rolled steel sheets were processed by recrystallization annealing at a constant temperature of 920° C. for 20 seconds in an atmosphere of 75 percent by volume of hydrogen and 25 percent by volume of nitrogen, in which the dew point was 35° C., whereby the content of C was decreased to 0.0020 wt % or less. Final finish annealing was performed for the steel sheets processed by recrystallization annealing, in which the heating rate was 50° C./hour from room temperature to 750° C. and 5° C./hour from 750 to 900° C. and a temperature of 900° C. was maintained for 50 hours.

By macroscopic observation of crystal grains of steel sheet obtained by finish annealing, it was confirmed that secondary recrystallization was completed at each annealing temperature for the hot-rolled steel sheet. In addition, magnetic flux densities after finish annealing in the rolling direction (L direction) and in the direction (C direction) perpendicular thereto were measured. Furthermore, EI cores were formed from the steel sheet products thus obtained, and the iron losses thereof were measured.

Figure 2A:
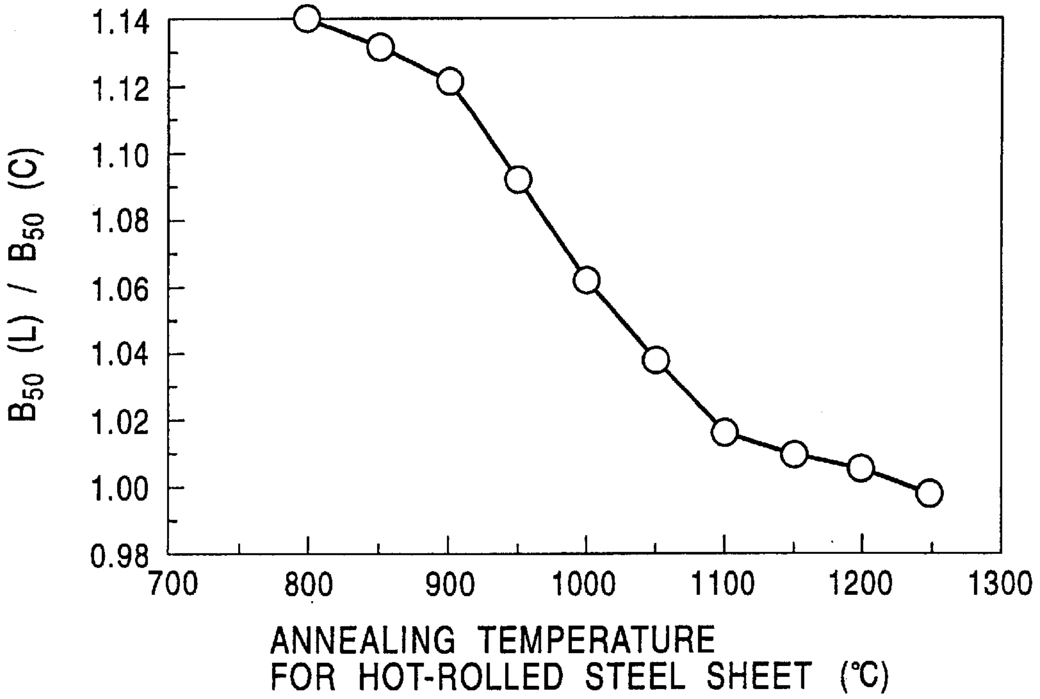
FIG. 2A is a graph showing the influence of annealing temperature for a hot-rolled steel sheet on the ratio of the magnetic flux density $B_{50}$ in an L direction of a steel sheet product to the magnetic flux density $B_{50}$ in a C direction of the steel sheet product, i.e., $B_{50}(L)/B_{50}(C)$.
Figure 2B:
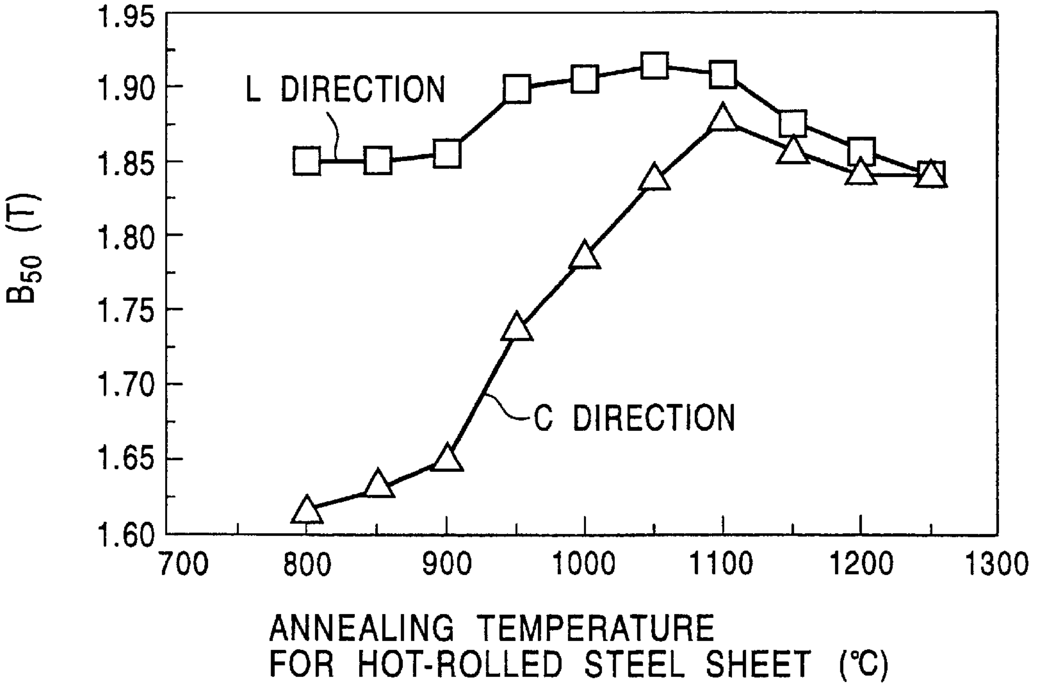
FIG. 2B is a graph-showing the influence of annealing temperature for a hot-rolled steel sheet on the magnetic flux densities $B_{50}$ in the L direction and in the C direction of the steel sheet product.

FIG. 2A shows the influence of annealing temperature for the hot-rolled steel sheet on the ratio of the magnetic flux density $B_{50}$ in the L direction to the magnetic flux density $B_{50}$ in the C direction of the steel sheet product, i.e. $B_{50}(L)/B_{50}(C)$, and FIG. 2B shows the influence of annealing temperature for the hot-rolled steel sheet on the magnetic flux densities $B_{50}$ in the L direction and in the C direction of the steel sheet product.

As shown in FIGS. 2A and 2B, when an annealing temperature for the hot-rolled steel sheet was low, the magnetic flux density in the L direction was significantly higher than that in the C direction. However, when the annealing temperature was increased, the magnetic flux density in the C direction was increased and finally became almost same as that in the L direction.

Figure 3:
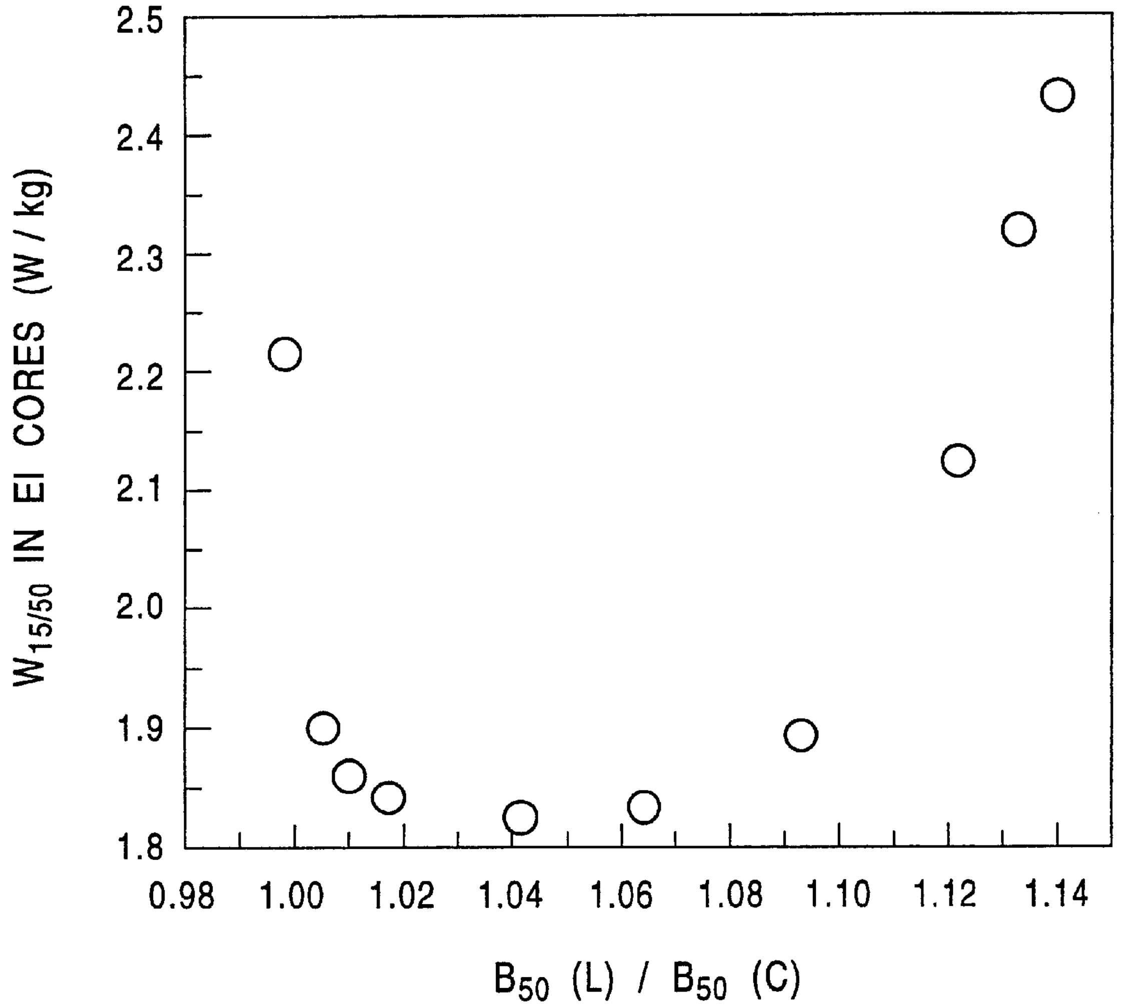
FIG. 3 is a graph showing the influence of $B_{50}(L)/B_{50}(C)$ on an iron loss ($W_{15/50}$) of an EI core formed of a steel sheet product.

FIG. 3 shows the influence of the $B_{50}(L)/B_{50}(C)$ ratio on the iron losses ($W_{15/50}$) of the EI core formed of the steel sheet product.

As shown in FIG. 3, when the $B_{50}(L)/B_{50}(C)$ was 1.005 to 1.100, that is, when the magnetic flux density in the L direction was slightly higher than that in the C direction, the iron loss of the EI core exhibited the most desirable value of 1.9 W/kg or less. The result described above was newly discovered.

The inventors of the present invention believe that the reason for the variation in magnetic flux density is a difference in texture of the steel sheets. Accordingly, by using X-ray diffraction in accordance with the Laue method, orientations of secondary recrystallized grains in the individual steel sheet products were measured. The measurement was performed in an area of 100 mm by 280 mm, and orientations of individual crystalline grains were measured.

Figure 4:
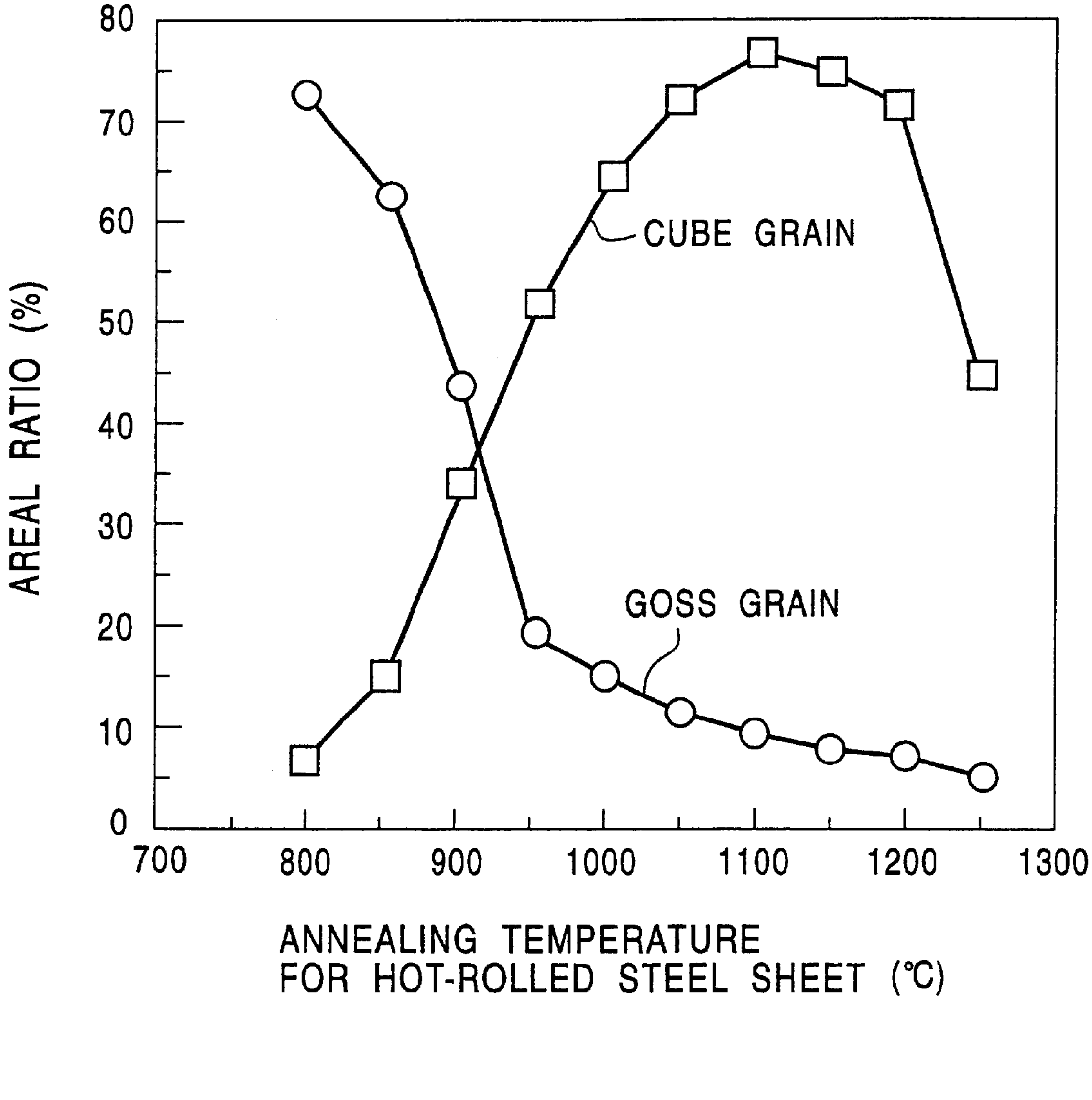
FIG. 4 is a graph showing the influence of annealing temperature for a hot-rolled steel sheet on an areal ratio of crystalline grains in a steel sheet product inclined by 20° or less with respect to the Goss orientation and on an areal ratio of crystalline grains inclined by 20° or less with respect to the cube orientation.

FIG. 4 shows the influence of annealing temperature for the hot-rolled steel sheet on the areal ratio of crystalline grains inclined by 20° or less with respect to the Goss orientation (GOSS GRAIN) in the steel sheet product and on the areal ratio of crystalline grains inclined by 20° or less with respect to the cube orientation (CUBE GRAIN) in the steel sheet product. In the case in which the steel ingot A was used, it was understood that when the annealing temperature for the hot-rolled steel sheet was 950° C. or more, a mixed state was formed in which a larger number of crystalline grains in the vicinity of the cube orientation were present than those in the vicinity of the Goss orientation.

In a temperature range for annealing a hot-rolled steel sheet of 950 to 1,200° C. in which the ratio of the magnetic flux density is 1.005 to 1.100, as shown in FIG. 2A, according to FIG. 4, the areal ratio of crystalline grains inclined by 20° or less with respect to the cube orientation was 50 to 80%, and the areal ratio of secondary recrystallized crystalline grains inclined by 20° or less with respect to the Goss orientation was 6 to 20%.

Next, in order to confirm the discovery described above, i.e., that the iron loss of the EI core exhibited the most desirable value when the magnetic flux density in the L direction was slightly higher than that in the C direction, the inventors of the present invention researched the magnetic flux densities of conventional electrical steel sheets. That is, EI cores were formed of steel sheet products using a singly oriented silicon steel sheet in which the Goss oriented-grains were integrated and doubly oriented silicon steel sheet in which the cube grains were highly integrated, both of which had a thickness of 0.35 mm and contained 2.5 wt % Si, equivalent to those of the steel sheet product formed of the steel ingot A. The magnetic flux densities of the steel sheets described above and the iron losses of the EI cores were measured. The results are shown in FIGS. 5A and 5B together with the results obtained by using the steel ingot A.

Figure 5A:
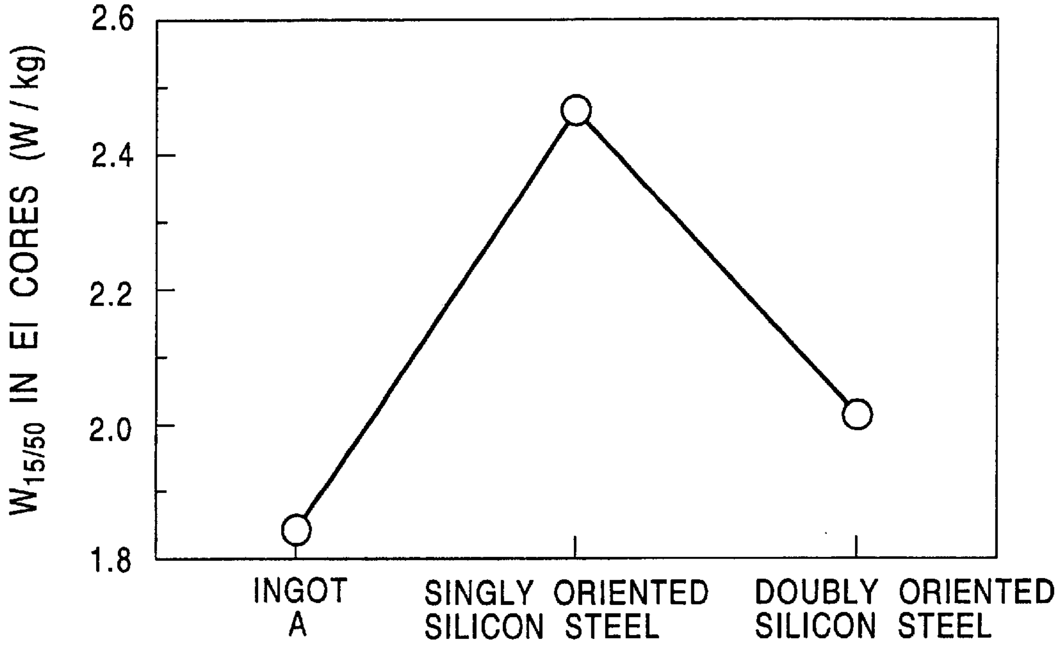
FIG. 5A is a graph showing iron losses of EI cores formed of a steel sheet made from ingot A, a singly oriented silicon steel sheet, and a doubly oriented silicon steel sheet.
Figure 5B:
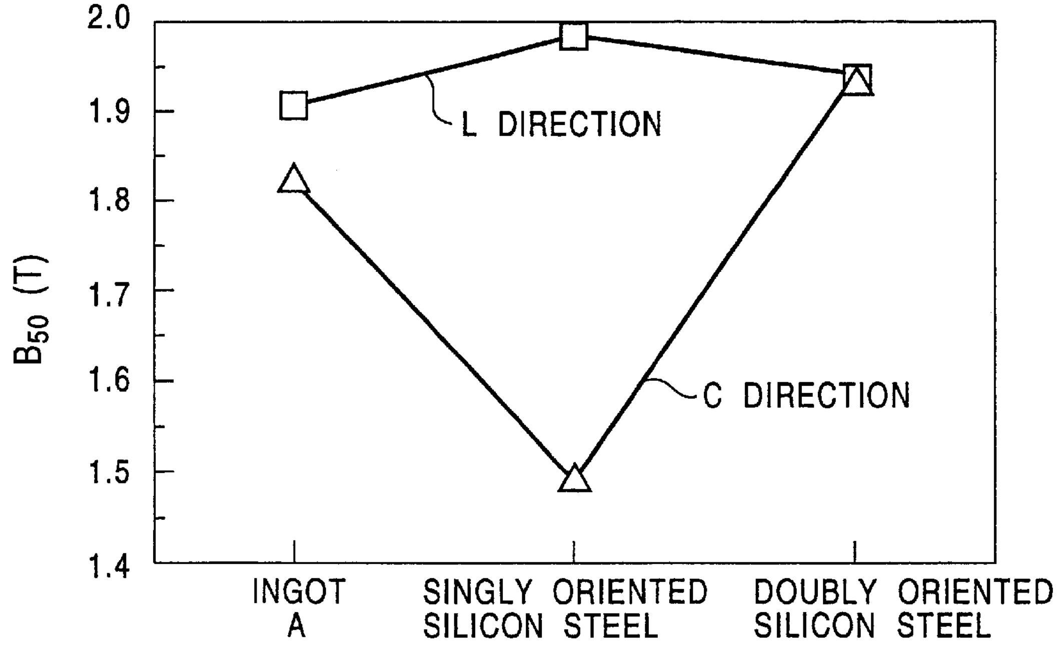
FIG. 5B is a graph showing magnetic flux densities of a steel sheet made from ingot A, a singly oriented silicon steel sheet, and a doubly oriented silicon steel sheet.

As shown in FIGS. 5A and 5B, the iron loss of the EI core formed of the electrical steel sheet obtained from the steel ingot A were superior to those obtained from the singly oriented and the doubly oriented silicon steel sheets. The ratio of the magnetic flux density in the L direction to that in the C direction of the electrical steel sheet obtained from the steel ingot A was 1.015. On the other hand, the ratios of the singly oriented and the doubly oriented silicon steel sheets were 1.331 and 1.002, respectively and were out of the preferred range of 1.005 to 1.100.

The results described above verified the experimental result obtained by the inventors of the present invention, in which, when the ratio of the magnetic flux density in the L direction to that in the C direction was 1.005 to 1.100, that is, when the magnetic flux density in the L direction is slightly higher than that in the C direction, the iron loss of the EI core exhibited the most desirable value.

In this connection, by using X-ray diffraction in accordance with the Laue method, orientations of secondary recrystallized grains were measured for individual steel sheet products of the singly oriented and the doubly oriented silicon steel sheets. The measurements were performed in an area of 100 mm by 280 mm, so that orientations of individual crystalline grains were measured.

The frequency of secondary recrystallized grains inclined by 20° or less with-respect to the Goss orientation was 96% in the steel sheet product of the singly oriented silicon steel sheet. The frequency of secondary recrystallized grains inclined by 20° or less with respect to the cube orientation was 90% in the steel sheet product of the doubly oriented silicon steel sheet.

The highly integrated orientations in the steel sheet products of the singly oriented and the doubly oriented silicon steel sheets, as described above, significantly increase anisotropies of the magnetic properties. When anisotropies of magnetic properties are significant, an iron loss of a compact EI core is degraded in which the flow of the magnetic flux changes in various directions. On the other hand, as is the case of the steel sheet product formed of the steel ingot A, when a texture is formed of crystalline grains appropriately grown inclined by 20° or less with respect to the cube orientation mixed with a small amount of crystalline grains inclined by 20° or less with respect to the Goss orientation, the iron loss of the EI core is superior. The reason for this is believed that both magnetic properties in the rolling direction and in the direction perpendicular thereto are superior, and degradation of the magnetic properties in other directions is relatively small.

As described above, the inventors of the present invention discovered that iron losses of EI compact transformers can be effectively reduced by using the steel ingot A, by appropriately growing both cube oriented-texture and Goss oriented-texture by secondary recrystallization in final finish annealing, and by controlling the ratio of the magnetic flux density in the rolling direction to that in the direction perpendicular thereto to be from about 1.005 to about 1.100.

In addition, in order to research the influence of the heating rate in final finish annealing, the inventors of the present invention conducted the following experiments.

The steel ingot A was heated to 1,150° C. and was then hot-rolled into a steel sheet 2.8 mm thick. After the hot-rolled steel sheet was processed at a constant temperature of 1,180° C. for 1 minute in a nitrogen atmosphere and was then quenched, the quenched steel sheet was cold-rolled, thereby yielding a steel sheet having a final thickness of 0.35 mm. The cold-rolled steel sheet thus obtained was processed by recrystallization annealing at a constant temperature of 920° C. for 20 seconds, so that the content of C was decreased to 0.0020 wt % or less. The steel sheets processed by recrystallization annealing were processed by finish annealing at various heating rates. The finish annealing was performed in which a temperature was increased at 50° C./hour from room temperature to 750° C. and at various rates from 750 to 900° C. and was then maintained at 900° C. for 50 hours.

The magnetic flux densities in the rolling direction (L direction) and in the direction (C direction) perpendicular thereto of the finishing annealed steel sheet were measured. In addition, EI cores were formed using the steel sheet products thus obtained, and the iron losses ($W_{15/50}$) thereof were measured. Furthermore, orientations of secondary recrystallized grains in the individual steel sheet products were measured using X-ray diffraction in accordance with the Laue method. The measurement was performed in an area of 100 mm by 280 mm, and the frequencies of crystalline grains in the vicinity of the cube orientation and those in the Goss orientation were obtained.

Figure 6A:
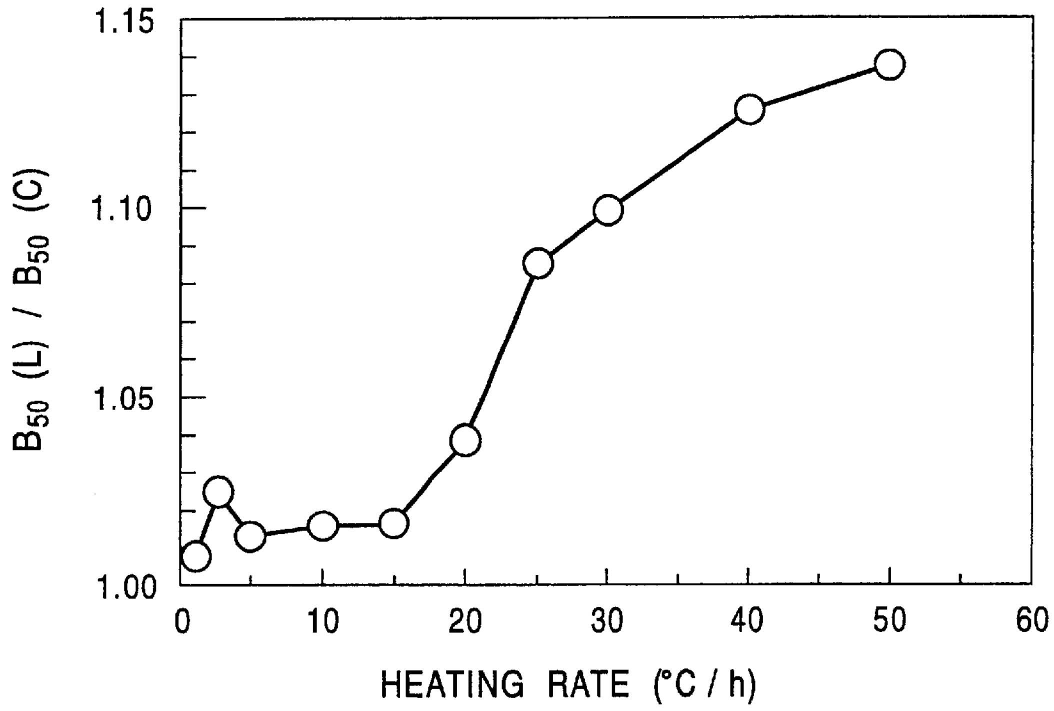
FIG. 6A is a graph showing the influence of the heating rate in a range of 750° C. or more in final finish annealing on the ratio of a magnetic flux density $B_{50}$ in an L direction to a magnetic flux density $B_{50}$ in a C direction of a steel sheet product, i.e., $B_{50}(L)/B_{50}(C)$.
Figure 6B:
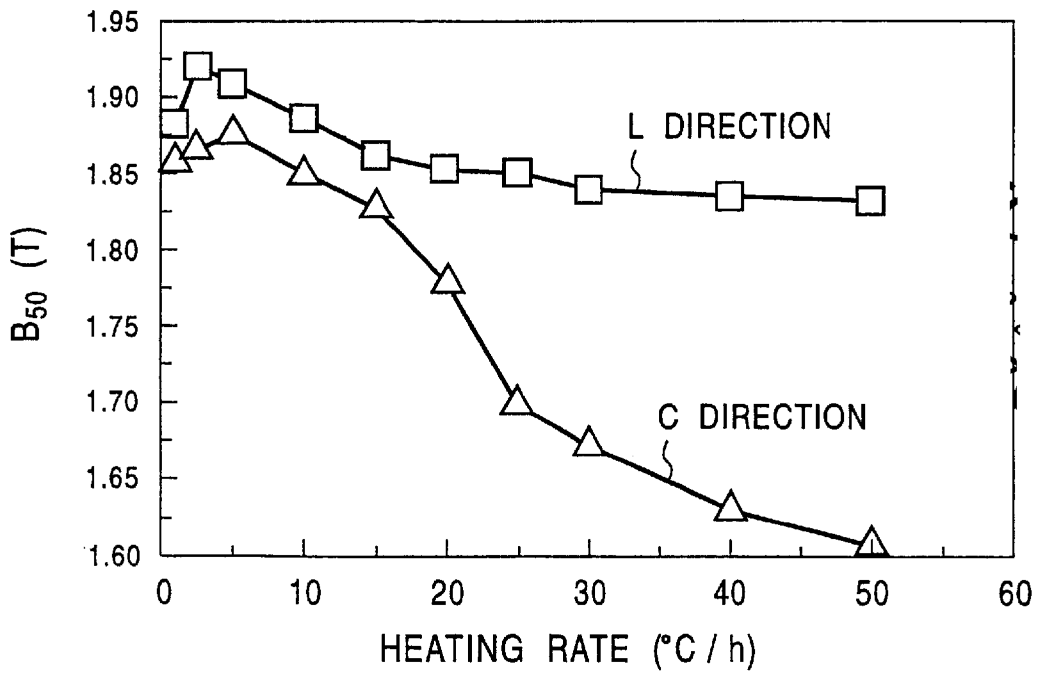
FIG. 6B is a graph showing the influence of the heating rate in a range of 750° C. or more in final finish annealing on the magnetic flux densities $B_{50}$ in the L direction and in the C direction of the steel sheet product.

FIG. 6A shows the heating rate in the range of 750° C. or more in final finish annealing on the ratio of the magnetic flux density $B_{50}$ in the L direction to the magnetic flux density $B_{50}$ in the C direction of the steel sheet product, i.e., $B_{50}(L)/B_{50}(C)$, and FIG. 6B shows the influence of the heating rate in the range of 750° C. or more in final finish annealing on the magnetic flux densities $B_{50}$ in the L direction and in the C direction of the steel sheet product.

According to FIG. 6A, when the heating rate was 30° C./hour or less, the ratio of the magnetic flux density in the L direction to that in the C direction was 1.100 or less. When the heating rate exceeded 30° C./hour, the ratio of the magnetic flux density in the L direction to that in the C direction exceeded 1.100.

Figure 7:
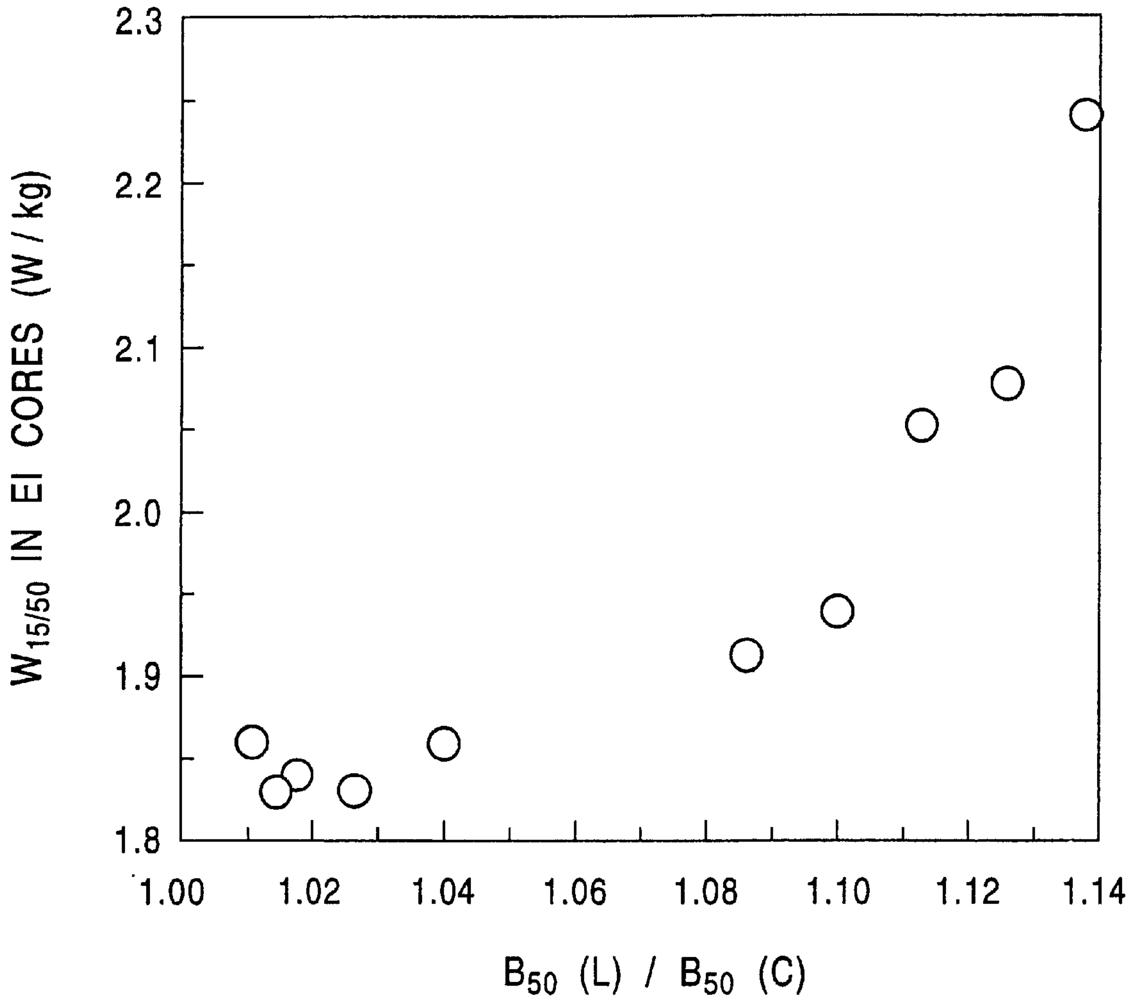
FIG. 7 is a graph showing the influence of the ratio of a magnetic flux density $B_{50}$ in an L direction to a magnetic flux density $B_{50}$ in a C direction of a steel sheet product, i.e., $B_{50}(L)/B_{50}(C)$, on the iron loss ($W_{15/50}$) of an EI core of a steel sheet product.

FIG. 7 shows the influence of the ratio of the magnetic flux density $B_{50}$ in the L direction to the magnetic flux density $B_{50}$ in the C direction of the steel sheet product, i.e., $B_{50}(L)/B_{50}(C)$ on the iron loss of the EI core of the steel sheet product.

Figure 8:
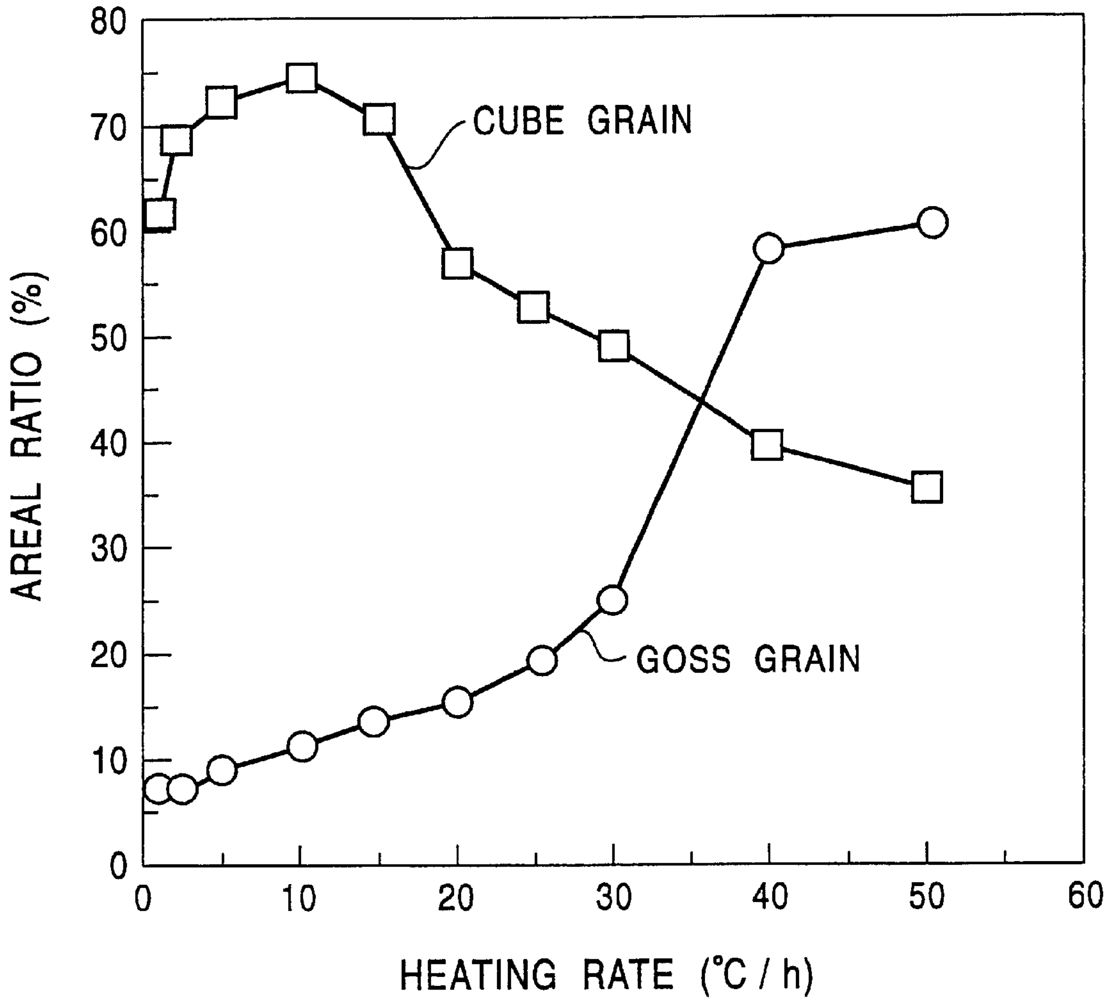
FIG. 8 is a graph showing the influence of heating rate in a range of 750° C. or more in final finish annealing on an areal ratio of crystalline grains in a steel sheet product inclined by 20° or less with respect to the Goss orientation and on an areal ratio of crystalline grains in the steel sheet product inclined by 20° or less with respect to the cube orientation.

In FIG. 8, the results are shown, in which the influence of the heating rate in a range of 750° C. or more in final finish annealing was measured on an areal ratio of crystalline grains in the steel sheet product inclined by 20° or less with respect to the Goss orientation and on an areal ratio of crystalline grains inclined by 20° or less with respect to the cube orientation.

According to FIG. 8, when the heating rate is increased, the number of grains in the vicinity of the cube orientation was decreased, and the number of grains in the vicinity of the Goss orientation was increased. In addition according to FIG. 8, it is understood that, when the heating rate is 30° C./hour or less, the steel sheet provided with a superior iron loss has an areal ratio of the grains in the vicinity of the cube orientation of 50 to 80% and an areal ratio of the grains in the vicinity of the Goss orientation of 6 to 20%.

As described above, the orientation of secondary recrystallized grains in the steel sheet processed by final finish annealing changes in accordance with the heating rate in a range of 750° C. or more. As a result, it is understood that, when the heating rate is set to be 30° C./hour or less in a range of 750° C. or more, a steel sheet having the most preferable texture for reducing an iron loss of an EI core can be obtained in which the ratio of the magnetic flux density in the rolling direction to that in the direction perpendicular thereto is 1.005 to 1.100.

Next, anti-noise properties were researched by the experiments described below.

A steel slab B was formed by continuous casting which has a composition of 240 ppm C, 3.24 wt % Si, 0.14 wt % Mn, 70 ppm Al, 8 ppm Se, 11 ppm S, 10 ppm N, 12 ppm O, and substantial iron as the balance. The slab thus formed was heated at 1,100° C. for 20 minutes and was then formed into a hot-rolled steel sheet 2.6 mm thick by hot rolling. The hot-rolled steel sheet was processed by annealing for a hot-rolled steel sheet and was then cold-rolled, thereby yielding the cold-rolled steel sheet having a final thickness of 0.35 mm. The cold-rolled steel sheet was processed by recrystallization annealing. Recrystallization annealing was performed at a constant temperature of 900° C. in a nitrogen atmosphere by changing a ratio of nitrogen. Finish annealing was performed for the steel sheets processed by recrystallization annealing, thereby yielding steel sheet products.

Macroscopic observation was performed for crystal grains of the steel sheet products thus obtained. As a result, it was confirmed that the areal ratio of secondary recrystallized grains was changed in accordance with a ratio of nitrogen in recrystallization annealing atmosphere.

Figure 9:
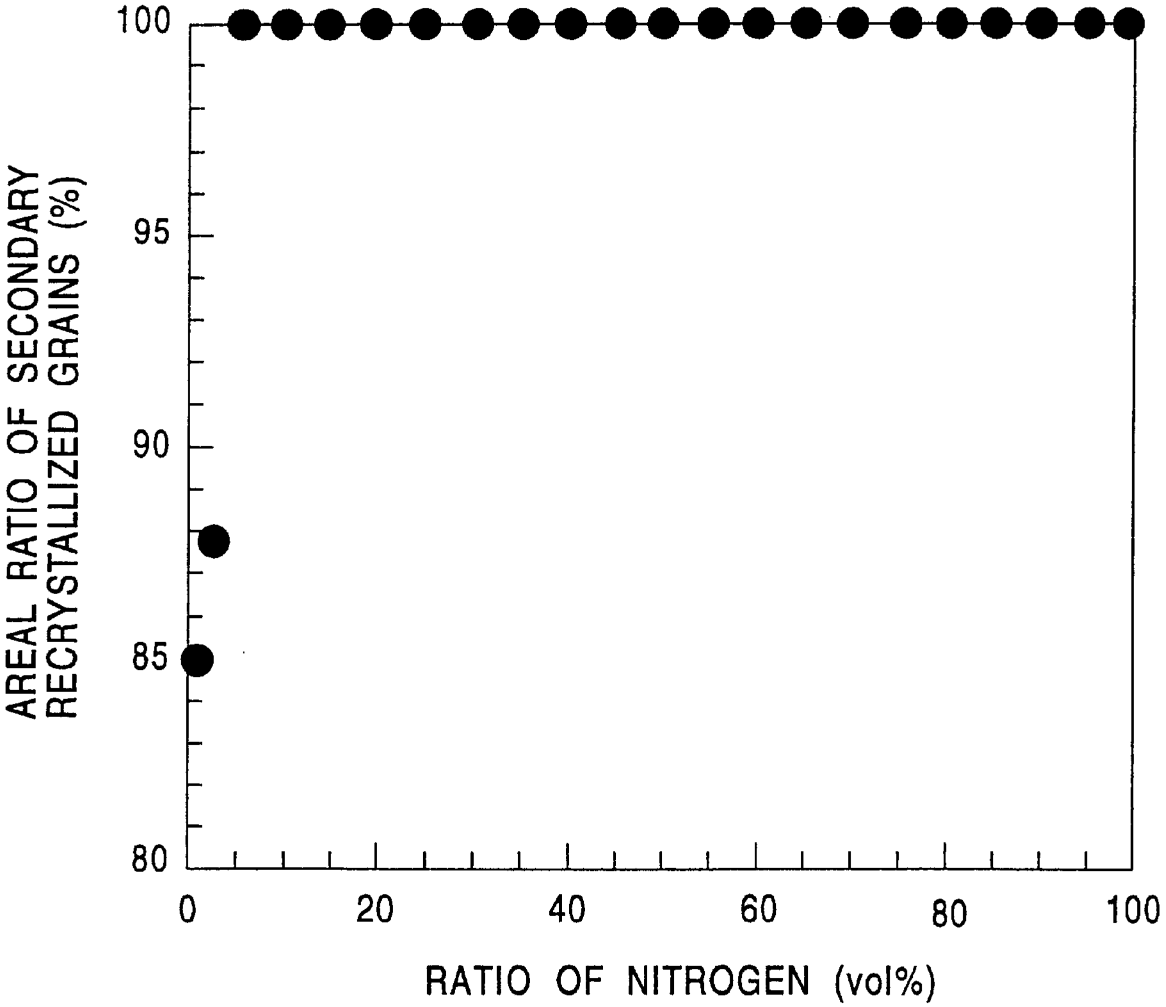
FIG. 9 is a graph showing the influence of the ratio of nitrogen in an atmosphere in recrystallization annealing on the areal ratio of secondary recrystallized grains in a steel sheet product.

FIG. 9 shows the influence of the ratio of nitrogen in recrystallization annealing atmosphere on the areal ratio of secondary recrystallized grains in the steel sheet product. According to FIG. 9, when the ratio of nitrogen was less than 5 volume percent, it was apparent that the areal ratio of secondary recrystallized grains was small.

The mechanism is not clearly understood in which the ratio of nitrogen in recrystallization annealing atmosphere has the influence on the areal ratio of secondary recrystallized grains. However, it is believed that a steel sheet nitrided in a nitrogen atmosphere in recrystallization annealing facilitates the secondary recrystallization.

Next, the influence of an annealing temperature for recrystallization on secondary recrystallization was researched. In the production process using the steel slab B, steel sheet products were manufactured at various annealing temperatures for recrystallization. In this experiment, the ratio of nitrogen in the atmosphere was controlled to be 50 volume percent. Magnetostrictions of the steel sheets obtained were measured in the rolling direction and in the direction perpendicular thereto by a laser Doppler method.

Figure 10:
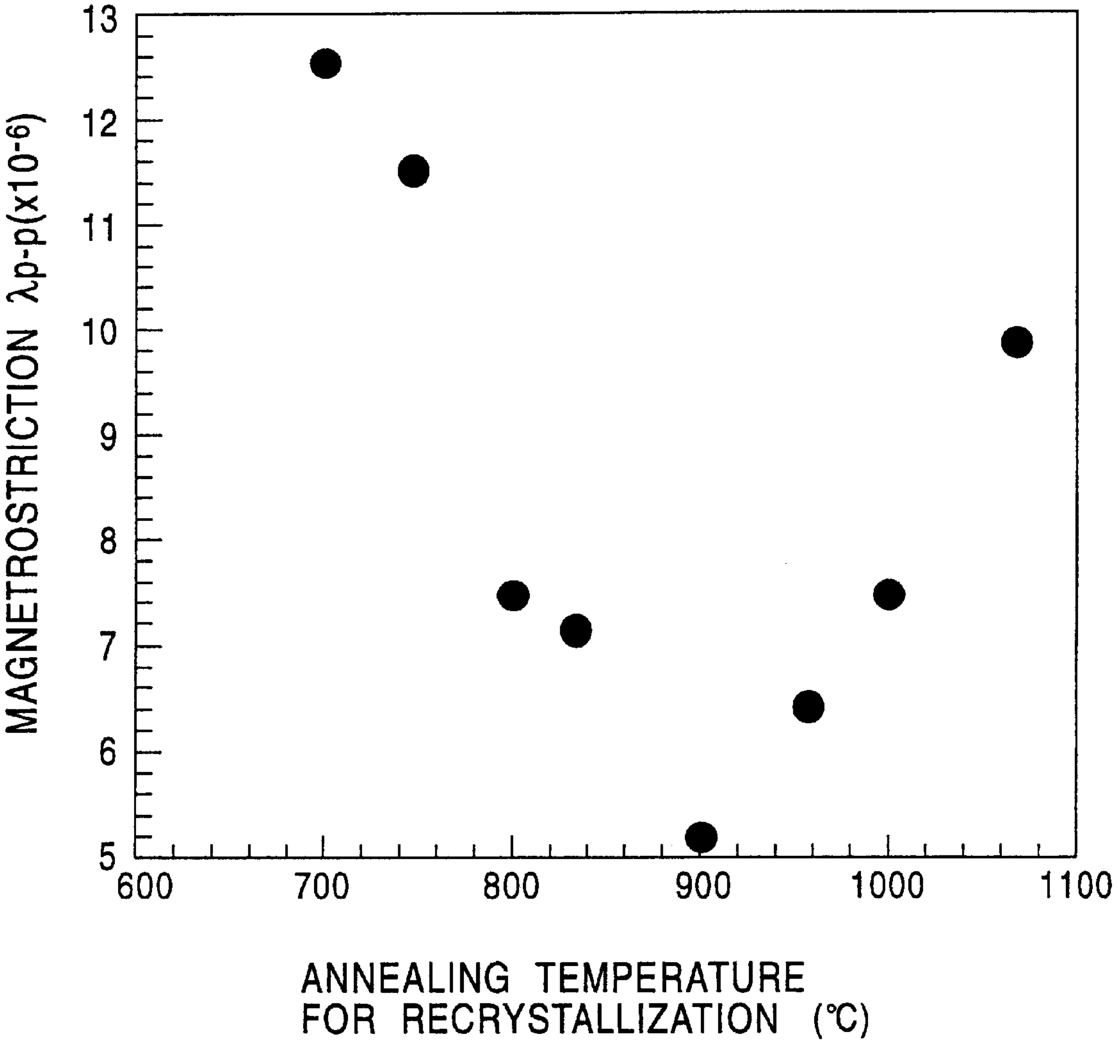
FIG. 10 is a graph showing the influence of the temperature in recrystallization annealing on magnetostriction in a steel sheet product.

FIG. 10 shows the influence of the annealing temperature for recrystallization on the sum of magnetostrictions in the rolling direction and in the direction perpendicular thereto of the steel sheet product. According to FIG. 10, in an annealing temperature for recrystallization of 800 to 1,000° C., the magnetostrictions in the rolling direction and in the direction perpendicular thereto were decreased to $7.5\times10^{-6}$ or less.

Figure 11:
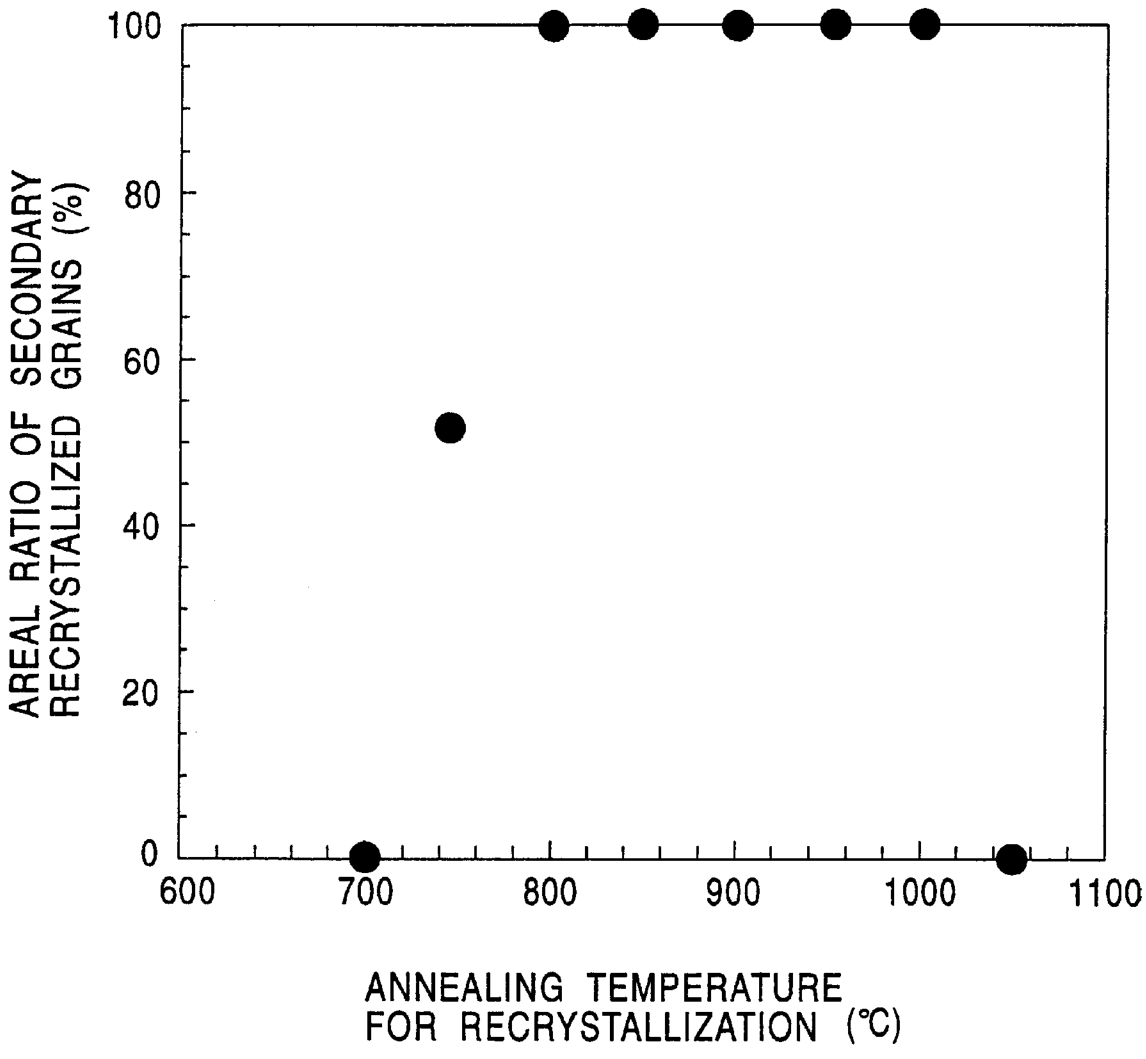
FIG. 11 is a graph showing the influence of the temperature in recrystallization annealing on the areal ratio of secondary recrystallized grains in a steel sheet product.

Macroscopic observation was performed for the steel sheets thus obtained. As a result, due to the difference in the annealing temperature for recrystallization, the areal ratios of secondary recrystallized grains differed from each other. FIG. 11 shows the influence of the annealing temperature for recrystallization on the areal ratio of secondary recrystallized grains of the steel sheet products. According to FIG. 11, it was understood that, when the annealing temperature for recrystallization was 800 to 1,000° C., the secondary recrystallization was completed.

From the experimental results described above, it was understood that, when secondary recrystallization was preferably completed, the magnetic properties in the rolling direction and in the direction perpendicular thereto were improved. Accordingly, a texture of the steel sheet was researched in detail, in which the secondary recrystallization was preferably completed.

In the case in which the steel sheet products formed from the steel slab B were preferably recrystallized, the annealing conditions for recrystallization, the sum of magnetostrictions in the rolling direction and in the direction perpendicular thereto, and the areal ratios of crystalline grains inclined by 15° or less with respect to the {100}<001> orientation are shown in Table 1.

According to Table 1, in a steel sheet product having a magnetostriction of $8.0\times10^{-6}$, the areal ratio of crystalline grains inclined by 15° or less with respect to the {100}<001> direction was apparently 30 to 70%.

Figure 12:
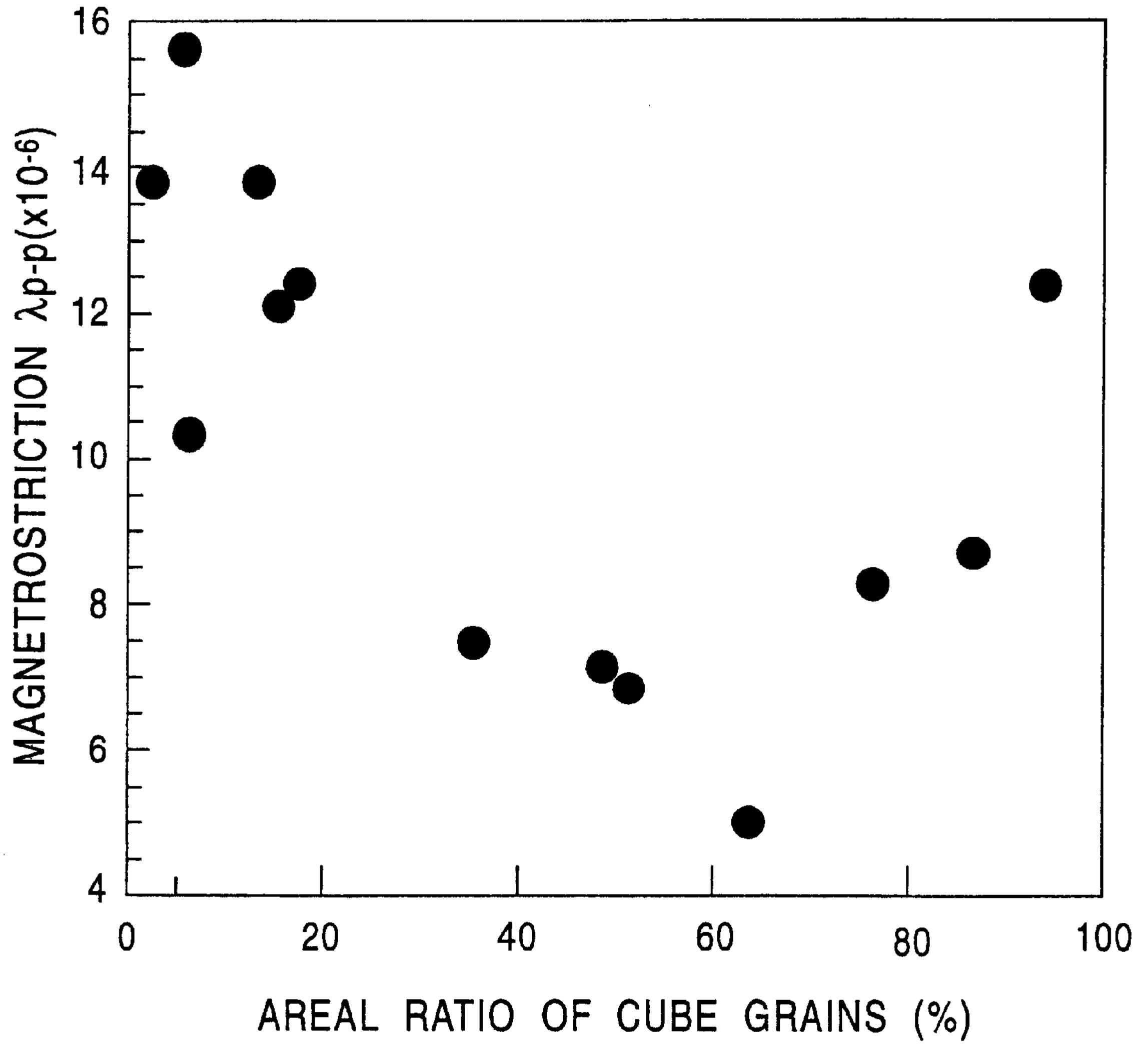
FIG. 12 is a graph showing the influence of an areal ratio of crystal grains inclined by 15° or less with respect to the {100}<001> orientation magnetostriction in a steel sheet product.

In addition, from steel slabs having various compositions, steel sheet products were manufactured in a manner similar to those-manufactured from the steel slab B, and the steel sheets were measured in which the secondary recrystallization was preferably completed. In FIG. 12, the influence of the areal ratio of the crystal grains inclined by 15° or less with respect to the {100}<001> orientation on the magnetostriction of the steel sheet product is shown.

According to FIG. 12, when the areal ratio of the crystal grains inclined by 15° or less with respect to the {100}<001> orientation was 30 to 70%, the sum of magnetostrictions in the rolling direction and in the direction perpendicular thereto was apparently $8.0\times10^{-6}$ or less.

The mechanism of the phenomenon described above is not clearly understood; however, it is believed that, when the degree of integration of <100> axes is less than 30% in both the rolling direction and the direction perpendicular thereto, 180° domains are decreased, and the magnetostriction is increased. On the other hand, it is also believed that, when the degree of integration of <100> axes exceeds 70%, since the degree of integration is too high, the degree of integration of <010> axes is also increased, and as a result, 90° domains are increased.

In order to perform quantitative evaluation of the influence of the sum of magnetostrictions in the rolling direction and in the direction perpendicular thereto on noise level in magnetization, the experiments described below were conducted. Ring-shaped samples 150 mm in diameter were cut away from singly oriented and non-oriented silicon steel sheets having various magnetic properties and were then stress-relief annealed at 750° C. for 2 hours. The annealed steel sheets were laminated, thereby forming iron cores. These iron cores thus formed were magnetized at a magnetic flux density of 1.5 T by an alternating current at a frequency of 50 Hz, and the noise was measured by a microphone disposed at a location of 100 mm over the iron core.

Figure 13:
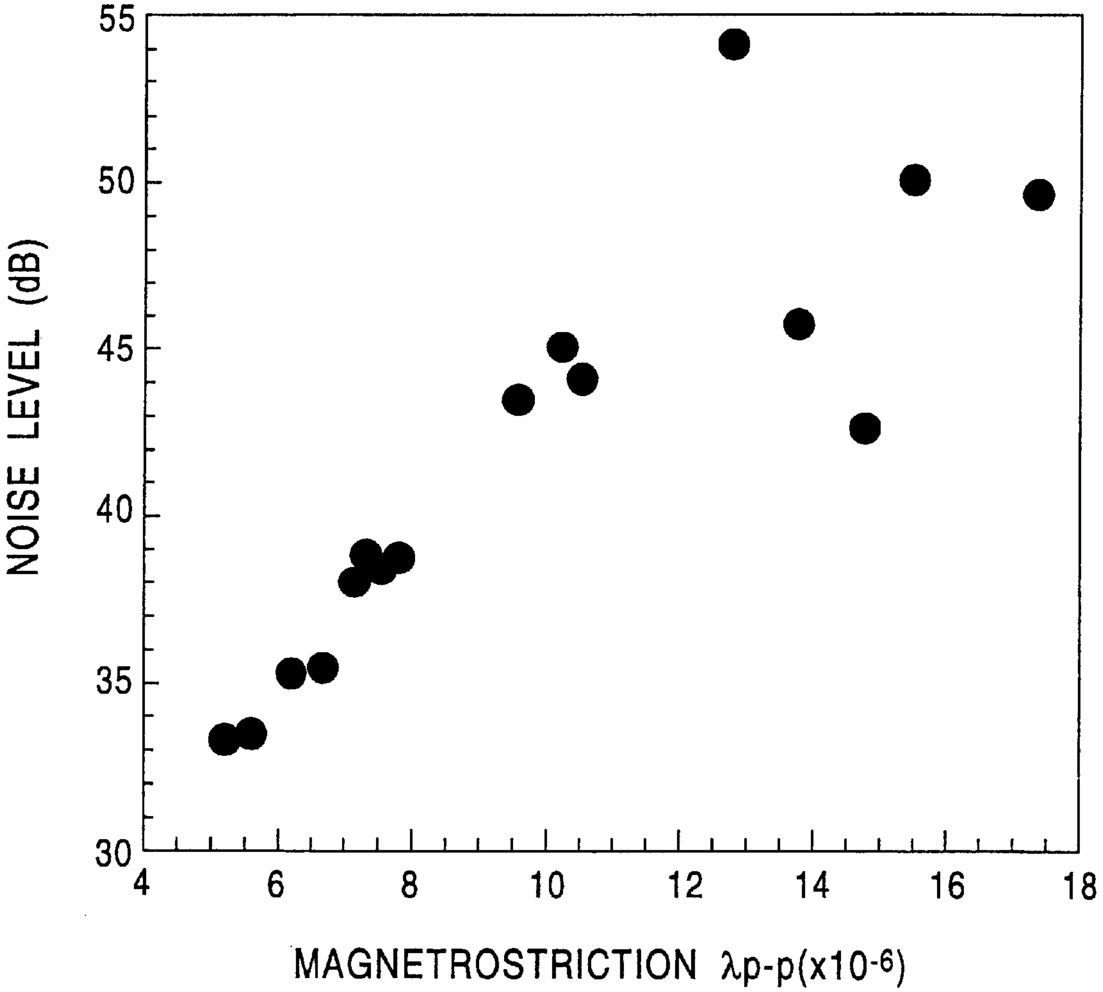
FIG. 13 is a graph showing the influence of the sum of magnetostrictions in a rolling direction and in the direction perpendicular thereto on noise level when magnetized.

In FIG. 13, the influence of the sum of magnetostrictions in the rolling direction and in the direction perpendicular thereto on the noise level when magnetized is shown. According to FIG. 13, when the sum of magnetostrictions was $8.0\times10^{-6}$ or less, the noise level was apparently decreased to 40 dB or less.

The mechanism of the phenomenon described above is not clearly understood; however, it might be considered as described below. In the case in which a compact iron core is used, magnetization is not only in the rolling direction but also in all directions in the steel sheet. Consequently, when magnetostriction properties in both the rolling direction and the direction perpendicular thereto are inferior, the noise is naturally increased. Even though magnetostriction properties in the rolling direction are superior, when magnetostriction properties in the direction perpendicular to the rolling direction is inferior, the noise is increased by the large magnetostriction in the direction perpendicular to the rolling direction.

Workability was optimized by using the understanding described below.

Oxides on surfaces of steel sheets are formed primarily in final finish annealing, and they increase distortions in fabrication. Final finish annealing is performed for secondary, recrystallization and, when an inhibitor is contained, is performed so as to remove AlN or the like. Since final finish annealing is generally performed at a high temperature, such as 1,200° C., oxidation of steel components cannot be prevented. In addition, when the temperature is increased, the deformation of the steel sheet is also increased, and adhesion between steel sheets is likely to occur. Accordingly, a large amount of a separator for annealing is required.

However, when an annealing temperature is high, an amount of the oxide formed on the surface of the steel sheet is increased. In addition, when an amount of the separator for annealing is increased, an amount of the oxide formed on the surface of the steel sheet is increased due to the presence of moisture or oxygen contained in the separator.

Accordingly, when an inhibitor component, which is removed for purification, is not added to a steel sheet beforehand, purification is not required in final finish annealing. That is, by decreasing an annealing temperature, formation of an oxide can be suppressed.

The inventors of the present invention researched a method for obtaining a secondary recrystallized texture having the cube orientation from steel containing Si but no inhibitor component. That is, experiments using a steel slab containing a reduced amount of an inhibitor, such as Al, O, N, S, or Se, were repeatedly conducted, in which hot rolling, annealing for a hot-rolled steel sheet, cold rolling, recrystallization annealing, and final finish annealing were performed.

As a result, the inventors of the present invention developed a method for manufacturing a doubly oriented silicon steel sheet composed of a secondary recrystallized texture, in which grains were integrated in the cube orientations, and the method was proposed in the specification of Japanese Patent Application No. 11-289523.

Next, the inventors of the present invention researched improved conditions based on the method described above for obtaining superior core properties without serious degradation of magnetic properties even after stamping. In order to further improve magnetic properties, the research was conducted first by focusing on a surface state of a steel sheet, in which an amount of an oxide formed on the surface was further decreased, and an adverse effect of tensile force imparted by a insulating coating provided on the oxide or the surface of the steel sheet was eliminated. Accordingly, an atmosphere for final finish annealing was variously changed, and steel sheet products were manufactured having various types of insulating coatings and various thicknesses thereof. Compact EI cores were manufactured by stamping the steel sheet products described above, and the magnetic properties thereof were measured.

As a result, after the process of trial and error, electrical steel sheets having superior iron core properties, even after stamping, were developed by using an oxide formed on the surface of the steel sheet and insulating coating conditions, which will be described later.

From the experimental results, it was understood that, when a texture was primarily formed of the cube-oriented texture in which some of the Goss-oriented texture was grown, the ratio of the magnetic flux density in the rolling direction to that in the direction perpendicular thereto is from about 1.005 to about 1.100, whereby a most suitable texture for use as an EI core material was obtained. The reason why the phenomenon described above occurs is not clearly understood; however, the inventors of the present invention believe as described below.

As manufacturing conditions for obtaining the texture described above, from about 0.003 to about 0.08 wt % C is effectively contained in the starting material. By the effect of dissolved C, cross-slip band is increased during rolling so as to facilitate the formation of a deformation region, and as a result, recrystallized grains in the cube orientation and in the Goss orientation are increased. In addition, when a rolling temperature is increased to a temperature of 100 to 250° C. in at least one pass in cold rolling, cross-slip band is effectively increased so as to facilitate the formation of a deformation region, and recrystallized grains in the cube orientation and in the Goss orientation are effectively increased.

As discovered in the experiment described above, annealing for a hot-rolled steel sheet is effectively performed in a range of from about 950 to about 1,200° C. In the step described above, it is believed that grain diameter before cold rolling are increased, the formation of recrystallized grains from the grain boundary is suppressed, and hence, the {111} texture after recrystallization annealing is decreased. It is well known that, since the {111} texture is likely to be occupied by the Goss grains, the {111} texture effectively make the Goss grains preferentially secondary recrystallized. Accordingly, it is believed that the reduction in the {111} texture is effective to decrease the secondary recrystallized Goss grains.

The {100}<011> grains are preferentially grown particularly after annealing for a hot-rolled steel sheet. In addition, the {100}<011> grains are stable grains in which the orientation thereof will not change in cold rolling. After recrystallization, the {100}<011> grains are still increased. It has been known that the {100}<011> grains are not likely to be occupied by the Goss grains. Hence, it is believed that the increase in the {100}<011> grains suppresses the growth the Goss grains, and instead, preferentially facilitates the growth of the cube grains.

In addition, it was discovered that, when the rate of increasing temperature was small in final finish annealing, the cube grains tended to primarily grow, and when the rate of increasing temperature was large, the Goss grains tended to primarily grow. The reason for the phenomena described above is believed that the influence of the heating rate on the incubation time for secondary recrystallized grain growth differs in accordance with crystalline orientations. However, a radical mechanism has not been clearly understood.

In the present invention, even though a steel ingot containing no inhibitor component is used, the secondary recrystallization occurs, and the reason for this is believed to be as described below.

The inventors of the present invention made intensive research on the mechanism in which the {110}<001> grains, i.e., the Goss grains, are secondarily recrystallized. As a result, the inventors discovered that grain boundary having a different angle of orientation of 20 to 45° played an important role, and the discovery was reported (Acta Material vol.45, p1285, (1997)). The different angle of orientation in the present invention means a minimum rotation angle required for overlapping adjacent crystalline lattices.

Figure 14:
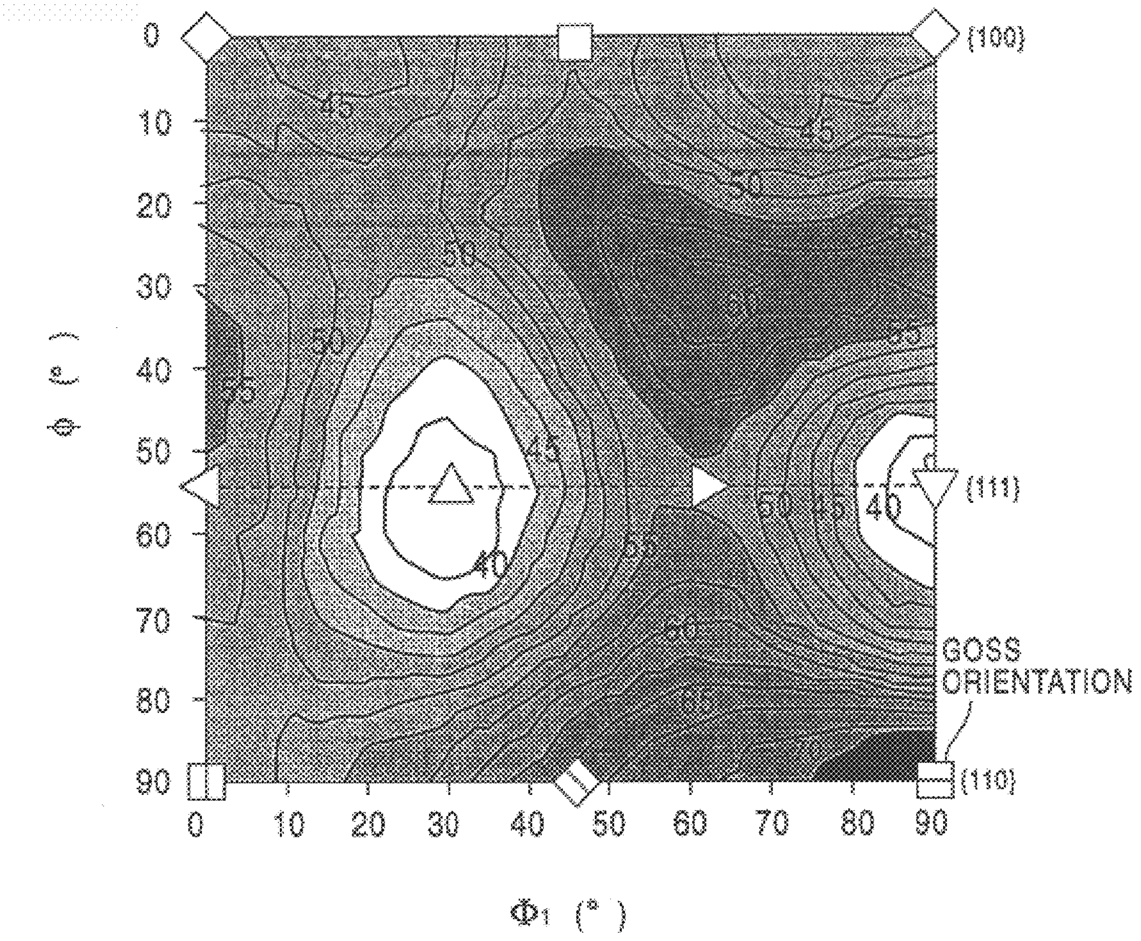
FIG. 14 is a view showing the frequency of grain boundaries having a difference angle of orientation of 20 to 45° with respect to individual oriented-grains in a first recrystallized texture of a singly oriented silicon steel sheet.

In FIG. 14, the results are shown which were obtained by the research on the ratio (%) of grain boundaries having a difference angle of orientation of 20 to 45° to the total using grain boundaries surrounding individual crystalline grains having various crystalline orientations. The research was conducted using a primary recrystallized texture of a singly oriented silicon steel sheet in a state in which secondary recrystallization is about to occur.

In FIG. 14, crystalline orientation space is represented by using a cross-section defined by Φ2=45° of the Euler angles (Φ1, Φ2, Φ3). In FIG. 14, major orientations, such as the Goss orientation, are schematically shown.

According to FIG. 14, concerning the frequency of grain boundaries having a different angle of orientation of 20 to 45° in the periphery of the Goss grain, the Coss orientation has the highest frequency. According to the experimental result made by C. G. Dunn et al (AIME Transaction vol.188, p368, (1949)), grain boundary having a different angle of orientation of 20 to 45° is a grain boundary having high energy. The grain boundary having high energy has a larger free volume and has a random structure. Grain boundary diffusion is a process in which atoms move across the grain boundary. Accordingly, the grain boundary diffusion of the grain boundary having high energy is faster, which has a larger free volume therein.

It has been well known that, concomitant with the growth of precipitation of a material called an inhibitor by diffusion-controlling, secondary crystallization occurs. The precipitation on the grain boundary having high energy is preferentially enlarged in final finish annealing. That is, on the grain boundary having high energy, a bobby pin is removed, grain boundary movement is initiated, and hence, the Goss oriented-grains are grown.

The research described above was even further progressed by the inventors of the present invention. As a result, it was discovered that a radical factor of secondary recrystallization was the distribution of grain boundaries having high energy in a primary recrystallized texture. In addition, it was also discovered that the role of an inhibitor was to produce a difference in movement speed between grain boundaries having high energy and the other grain boundaries.

According to the theory described above, without using an inhibitor, secondary recrystallization can be performed when a difference in movement speed of grain boundaries is produced.

Elements contained in steel, as impurities, are likely to localize on grain boundaries, and more particularly, on grain boundaries having high energy. Hence, when a large amount of impurity elements is contained, it is believed that there is no substantial difference in movement speed between grain boundaries having high energy and the other grain boundaries.

Consequently, when the influence of the impurity elements is eliminated by purifying a starting material, secondary recrystallization of the Goss grains can be performed. The reason for this is that an essential difference in movement speed depending on the structures of the grain boundaries having high energy can be anticipated to work.

Based on the considerations described above, the inventors of the present invention discovered that secondary recrystallization could be performed in a steel slab containing no inhibitor component by purification of a starting material.

In the technique of the present invention in which an inhibitor is not used, the orientations of the secondary recrystallized grains include orientations in the vicinity of the {100}<001> direction. That is, the technique described above differs from the technique using an inhibitor.

In the case in which an inhibitor is not contained, crystalline textures are significantly enlarged after hot rolling or annealing for a hot-rolled sheet. Hence, it is believed that the {111} texture grown by nucleation is decreased in recrystallization annealing performed after cold rolling. The {111} texture is known as an advantageous texture for the growth of the Goss grains. It is believed that, since the texture described above is decreased, the {100}<001> grains are secondary recrystallized instead of the Goss grains. However, the radical mechanism thereof is not clearly understood.

Hereinafter, the reasons for the specifications of constituent elements of the present invention will be described.

In view of improvement in magnetic properties, the specification of the components in the composition will first be described.

Si: from about 2.0 to about 8.0 wt %

Si is an effective element for increasing electric resistance and improving an iron loss. When the content of Si is less than about 2.0 wt %, the effect of the improvement is not significant, and the $\gamma$ transformation occurs. By the $\gamma$ transformation, a transformation texture is formed after hot rolling and final finish annealing, and hence, superior magnetic properties cannot be obtained. On the other hand, when the content of Si exceeds about 8.0 wt %, fabrication properties of the product are degraded, and the saturated magnetic flux density is also decreased. Accordingly, the content of Si is specified to be from about 2.0 to about 8.0 wt %.

Mn: from about 0.005 to about 3.0 wt %

Mn is an essential element for improving hot-workability. When the content of Mn is less than about 0.005 wt %, the effect thereof is not significant, and on the other hand, when the content thereof exceeds about 3.0 wt %, secondary recrystallization is difficult to perform. Accordingly, the content of Mn is specified to be from about 0.005 to about 3.0 wt %.

Al: from about 0.0010 to about 0.020 wt %

In the present invention, when a small amount of Al is contained, secondary recrystallization is preferably performed in finish annealing and the cube grains are appropriately grown. However, when the content of Al is less than about 0.0010 wt %, degrees of integration in the cube orientation and in the Goss orientation are decreased, and the magnetic flux density is also decreased. On the other hand, when the content of Al exceeds about 0.020 wt %, degrees of integration in the cube orientation and in the Goss orientation are also decreased, and desired magnetic properties cannot be obtained. As a result, the content of Al is specified to be from about 0.0010 to about 0.020 wt %.

It is believed that a small amount of Al forms a dense oxide layer on the surface and serves to effectively suppress the progress or surface oxidation and nitriding in finish annealing; however, the role of Al is not clearly understood.

In the present invention, the content of nitrogen is reduced as small as possible as a component of a starting material. Consequently, the method of the present invention differs from a conventional method for manufacturing a singly oriented silicon steel sheet, in which secondary recrystallization is performed using AlN as an inhibitor.

The contents of Se and S are preferably about 100 ppm or less, respectively, and the contents of O and N are preferably about 50 ppm or less, respectively. The reason for this is that Se, S, O, and N significantly interfere with the growth of secondary recrystallized texture. In addition, the elements described above are harmful elements which remain in the steel sheet and degrade an iron loss. The respective contents of Se and S are more preferably 50 ppm or less, and even more preferably, 30 ppm or less. The contents of O and N are more preferably 30 ppm or less, respectively. Since the elements described above are difficult to remove in subsequent steps, the elements, contained in molten steel, are preferably removed.

Heretofore, the essential components and the elements to be suppressed are described, and in addition, elements described below may be optionally added according to the present invention.

In order to improve a magnetic flux density, Ni may be added. However, when the content of Ni is less than about 0.01 wt %, the improvement in magnetic properties is not significant. On the other hand, when the content of Ni exceeds about 1.50 wt %, the secondary recrystallization is not sufficiently completed, and hence, satisfactory magnetic properties cannot be obtained. Accordingly, the content of Ni is specified to be from about 0.01 to about 1.50 wt %.

In order to improve an iron loss, 0.01 to 1.50 wt % Sn, 0.005 to 0.50 wt % Sb, 0.01 to 1.50 wt % Cu, 0.005 to 0.50 wt % Mo, and 0.01 to 1.50 wt % Cr may be added. When the contents of the individual elements are less than those described above, the effect of improving an iron loss cannot be obtained. On the other hand, when the contents thereof exceed the ranges described above, the secondary recrystallization will not occur, and the iron losses are degraded. As a result, the contents described above are specified.

In the present invention, the magnetic flux densities in the rolling direction (L direction) and in the direction perpendicular thereto (C direction) have to meet the ranges described below.

That is, it is essential that the magnetic flux densities $B_{50}$ in the L direction and in the C direction are controlled to be about 1.70 T or more, and the ratio $B_{50}(L)/B_{50}(C)$ is controlled to be from about 1.005 to about 1.100. The reason for this is that the iron loss of a compact transformer, in particular, such an EI core, can be effectively decreased.

When the magnetic flux density $B_{50}$ is less than about 1.70 T, the hysteresis loss is increased, and the iron loss is increased. In addition, when the $B_{50}(L)/B_{50}(C)$ is out of the range of about 1.005 to about 1.100, the iron loss is increased at which magnetization direction is rotated inside the core, and the iron loss of the entire core is also increased. Accordingly, the magnetic flux density must meet the conditions described above.

In addition, in order to obtain magnetic properties as described above, it is effective that orientations of crystalline grains are controlled constituting a steel sheet product.

That is, it is important that the areal ratio of crystalline grains inclined by 20° or less with respect to the cube orientation be set to be from about 50 to about 80%, and the areal ratio of crystalline grains inclined by 20° or less with respect to the Goss orientation be set to be from about 6 to about 20%. When the texture thus described is obtained, the magnetic flux densities in the L direction and in the C direction can be effectively controlled to be 1.70 T or more, and the $B_{50}(L)/B_{50}(C)$ can be effectively controlled to meet the range of 1.005 to 1.100.

Next, in view of improvement in anti-noise properties, the reason for the specification will be described.

An Areal Ratio of the Crystal Grains Inclined by 15° or Less with Respect to the {100}<001> Orientation: 30 to 70%

When the areal ratio of the crystal grains inclined by 15° or less with respect to the {100}<001> orientation is less than 30%, the degrees of integration of the <100> axes in the rolling direction and in the direction perpendicular thereto are decreased, and hence, the magnetostriction properties in the directions mentioned above are degraded. On the other hand, when the areal ratio exceeds 70%, the magnetostrictions in the rolling direction and in the direction perpendicular thereto are increased. In addition, when the {100}<001> orientations are highly integrated, the <110> orientations are integrated in the direction inclined by 45° with respect to the rolling direction, and as a result, degradation of magnetic properties occurs in iron cores for use in compact electric devices. The reason for this is that, even though the magnetic properties are superior in the rolling direction and in the direction perpendicular thereto, the magnetic properties is inferior in the, direction inclined by 45° with respect to the rolling direction.

By the reasons described above, the areal ratio of the crystal grains inclined by 15i° with respect to the {100}<001> orientation is specified to be 30 to 70%.

The Sum of Magnetostrictions in the Rolling Direction and in the Direction Perpendicular thereto when Magnetized to 1.5 T at 50 Hz of Alternating Current: $8\times10^{-6}$ or Less Magnetostriction is the major reason for generating noise. The reason for the specification described above is that, when magnetized to 1.5 T at 50 Hz of alternating current, and when the sum of magnetostrictions in the rolling direction and in the direction perpendicular thereto exceeds $8\times10^{-6}$, the noise is significantly enlarged.

Next, the reasons for the specifications of constituent elements for preventing the degradation caused by fabrication are described below.

It is important that an amount of an oxide formed on the surface of a steel sheet be controlled to be 1.0 g/m$^2$ or less on one surface as an amount of oxygen except for an insulating coating. The oxide on the surface of the steel sheet is formed primarily in final finish annealing.

When the amount of oxide exceeds about 1.0 g/m$^2$ as an amount of oxygen, the deformation at cut area is increased after cutting or stamping. That is, a large distortion is generated in the vicinity of the cut area, and as a result, the iron loss is significantly degraded.

The oxide described above is an oxide formed of at least one of components in steel or in a separator for annealing. The main oxides formed are forsterite, silica, alumina, magnesia, and compounds thereof having spinel structures.

The oxides described above may be formed in heating treatments, such as annealing for decarburization, annealing for flattening, or the like, in addition to final finish annealing. However, in consideration of the case described above, the amount of oxide must be finally controlled to be 1.0 g/m$^2$ or less as an amount of oxygen except for an insulating coating.

In addition, in order to improve insulation properties, a coating must be formed on the surface of the steel sheet.

Furthermore, the sum of tensile force of the oxide and the insulating coating imparted to the steel sheet is preferably set to be 5 MPa or less. When the tensile force described above is more than 5 MPa, magnetic properties are degraded in the L direction or in the C direction, in which the degree of integration of the <100> axes is lower.

In order to reduce the tensile force described above, it is effective that the thicknesses of the oxide and the insulating coating be decreased, a insulating coating material baked at a lower temperature be used, and a insulating coating having a lower coefficient of thermal expansion or a lower Young's modulus be used.

Next, the manufacturing method of the present invention will be described.

Components of the starting material will first be described.

C: from about 0.003 to about 0.08 wt %

C is an effective element to facilitate localized deformations in crystalline grains and to facilitate the growth of the cube-oriented and the Goss-oriented textures so as to improve the magnetic properties. When the content of C is less than about 0.003 wt %, the effect of the growth of the deformation regions is small, and hence, the magnetic flux, density is decreased. On the other hand, when the content of C exceeds about 0.08 wt %, the C is difficult to remove in recrystallization annealing. In addition, the γ deformation may occur in annealing for a hot-rolled steel sheet, and hence, the diameters of grains before cold rolling are difficult to increase. Accordingly, the content of C is specified to be from about 0.003 to about 0.08 wt %.

Concerning the other components in the starting material, the reasons for the specifications thereof are similar to those as described for the steel sheet product.

Molten steel having the preferable composition described above is formed into a steel slab by using a common casting method or a continuous casting method. A direct casting method may be alternatively used so as to manufacture a thin steel sheet 100 mm thick or less.

The slab is heated and is then hot-rolled by a common method. In this step, after casting, hot rolling may be immediately performed without reheating step. In addition, when a thin steel sheet is formed by casting, hot rolling may be omitted.

A temperature of approximately 1,100° C. is sufficient for heating a steel slab, which is the minimum temperature at which hot rolling can be performed. Since an inhibitor component is not contained in the starting material, a high temperature heating is not necessary to dissolve the inhibitor.

Next, annealing for a hot-rolled steel sheet is performed for the hot-rolled steel sheet. In order to appropriately grow the cube-oriented texture and the Goss-oriented texture in a steel sheet product, the temperature must be set to be from about 950 to about 1,200° C. When the annealing temperature for a hot-rolled steel sheet is less than about 950° C., the diameters of grains before cold rolling are not increased, and the degrees of growths of the cube-oriented and the Goss-oriented textures in the steel sheet product are decreased, whereby desired magnetic properties cannot be obtained. On the other hand, when the temperature exceeds about 1,200° C., the degree of growth of the Goss-oriented texture in the steel sheet product is decreased, and hence, the anisotropy of the magnetic flux density is degraded. As a result, the annealing temperature for a hot-rolled steel sheet must be set to be from about 950 to about 1,200° C.

After annealing for a hot-rolled steel sheet, cold rolling is performed at least once when necessary, in the case in which cold rolling is performed two times or more, an intermediate annealing is performed therebetween, and recrystallization annealing is performed which also works as annealing for decarburization. In recrystallization annealing, the content of C is decreased to 50 ppm or less, and more preferably, to 30 ppm or less, which is a level at which magnetic aging may not occur.

Annealing for a hot-rolled steel sheet is effective to improve magnetic properties. Similarly to the above, intermediate annealing performed between cold rolling is effective to stabilize magnetic properties. However, both annealing steps increase manufacturing cost. Accordingly, the decision to perform annealing for a hot-rolled steel sheet and intermediate annealing and the determination of annealing temperature and time may be made in view of economic considerations and in view of necessity of controlling the diameters of primary recrystallized grains in an appropriate range.

In order to grow the {100}<001> texture during final finish annealing, it is important that the average crystalline grain diameter be 200 $\mu$m or more before final cold rolling, and the reduction rate be 60 to 90%. In addition, in view of the growth of the secondary recrystallized grains in the cube orientation, the cold rolling is effectively performed at a temperature of 150° C. or more. In addition, cross rolling or cold rolling, performed under conditions in which the steel sheet width is increased by low tensile force, may be used.

As described above, in recrystallization annealing, when the annealing temperature is less than 800° C. or more than 1,000° C., the progress of the secondary recrystallization is inhibited. In addition, when the ratio of nitrogen in the annealing atmosphere is less than 5 vol %, the progress of the secondary recrystallization is adversely affected. When the secondary recrystallization may not properly occur, grains having various orientations are formed, and hence, the magnetostriction properties are degraded. Accordingly, in the present invention, the annealing temperature for recrystallization is set to be from about 800 to about 1,000° C., and the ratio of nitrogen in the atmosphere is set to be at least about 5 vol %.

In addition, after final cold rolling or after recrystallization annealing, a technique for increasing the Si content is also used by a silicon immersion method.

After the steps described above, when necessary, a separator for annealing is used. As a separator, a slurry or a colloidal solution is preferable, which contain a powdered refractory, such as silica, alumina, or magnesia. In addition, a method is more preferably in which the powdered refractory is adhered on a steel sheet by dry coating, such as electrostatic coating. The reason for this is that moisture will not be contained in an atmosphere in final finish annealing. Furthermore, a method is used in which a steel sheet coated with the powdered refractory by flame spray coating is provided between steel sheets.

Next, by performing final finish annealing, the secondary recrystallized texture is grown.

In final finish annealing, in view of the growth of the cube-oriented texture and the growth of the Goss-oriented texture in the steel sheet product, it is significantly important that the average heating rate be set to be 30° C./hour or less in a range of 750° C. or more, and a temperature be increased to a range of 800° C. or more and be maintained for 10 hours or more. When the average heating rate of increasing temperature is 30° C./hour or more in a range of 750° C. or more, the cube-oriented texture is decreased, and the Goss-oriented texture is increased, whereby desired magnetic properties cannot be obtained. In this step, since the heating rate in a range of less than 750° C. has not significant influence on the magnetic properties, an optional condition may be used. In addition, when the temperature for controlled heating is less than 800° C., the growth of the secondary recrystallization may be insufficient, and hence, the magnetic properties are degraded. Accordingly, the controlled heating must be performed at a temperature of 800° C. or more.

Furthermore, in the case in which an underlying film, such as a forsterite film, is required, even though not necessary to grow the secondary recrystallized grains, a temperature may be increased to approximately 1,100° C.

In order to improve the workability, an oxide formed on the steel sheet must be controlled to be 1 g/m$^2$ or less on one surface as an amount of oxygen except for an insulating coating. Accordingly, an atmosphere for final finish annealing must be controlled in which the dew point is 10° C. or less, and the volume percentage of oxygen is 0.1 or less. In addition, in order to suppress the growth of the oxide, the finish annealing temperature must be set to be 1,100° C. or less, and more preferably, 900° C. or less. In order to set the final finish annealing temperature to be 900° C. or less, the content of Al is preferably limited to be 0.01 wt % or less so as to decrease a temperature at which the secondary recrystallization occurs.

When laminated steel sheets are used, in order to improve the iron loss after final finish annealing, it is effective that an insulating coating be applied on the surface of the steel sheet.

In order to achieve the object described above, an insulating coating composed of a multilayer film having at least two types of films may be used, or in accordance with the application, a coating composed of a resin or the like may be used.

Furthermore, an insulating coating primarily composed of a phosphate, which imparts tensile force, may be effectively used so as to decrease an iron loss and noise.

Coating treatment will be described below in which workability is preferably improved by coating.

In order to decrease tensile force imparted to the steel sheet, it is effective that the thicknesses of an oxide and a insulating coating be decreased, an insulating coating material having a low baking temperature be used, and an insulating coating having a low coefficient of thermal expansion or a low Young's modulus.

The type of an insulating coating is not specifically limited so long as the tensile force imparted to a steel sheet is 5 MPa or less. For example, an organic coating or a semi-organic coating composed of an organic resin and an inorganic component is preferable. As an inorganic component, there may be mentioned one or at least two components selected from the group consisting of phosphoric acid, a phosphate, chromic acid, a chromate, a dichromate, boric acid, a silicate, silica, and alumina. The coating containing an organic resin described above is preferable since distortion at cut portion formed by cutting or stamping is not only suppressed, but also degradation of the iron loss after fabrication is prevented.

The thicknesses of the organic resin coating and the semi-organic coating are preferably set to be approximately 0.5 to 5 $\mu$m. The lower limit of the thickness is determined so as maintain the insulation between the layers, and the upper limit thereof is determined so as to reduce the tensile force and so as to prevent the reduction in the areal ratio.

In addition, an inorganic coating may be used composed of one or at least two components selected from the group consisting of a phosphate and chromic acid, a chromate, a dichromate, and a boric acid. In the case in which an contain organic coating is used, in order to control the tensile force to be 5 MPa or less, it is preferable that the baking temperature be set to be 400° C. or less, and the thickness of the coating be set to be 2 μm or less on one surface. Furthermore, in order to improve the heat stability, a small amount of finely powdered silica, alumina, or a colloid thereof may be contained.

EXAMPLES

Example 1

A steel slab was formed by continuous casting having a composition of 0,009 wt % C, 2.4 wt % Si, 0.02 wt % Mn, 0.012 wt % Al, 3 ppm Se, 14 ppm S, 10 ppm O, 9 ppm N, and substantial Fe as the balance. The steel slab was heated to 1,000° C. for 20 minutes and was hot-rolled to form a hot-rolled steel sheet 3.0 mm thick. The hot-rolled steel sheet was processed by annealing for a hot-rolled steel sheet at a constant temperature shown in Table 2 for 30 seconds and was then cold-rolled at 150° C., thereby yielding a cold-rolled steel sheet having a final thickness of 0.35 mm. Recrystallization annealing was performed for the cold-rolled steel sheet thus formed at a constant temperature of 930° C. for 10 seconds in an atmosphere of 75 vol % hydrogen and 25 vol % nitrogen, in which the dew point is 20° C., thereby decreasing the content of C to 10 ppm. The annealed steel sheets was heated to 750° C. at a heating rate of 50° C./hour and to a range of 750 to 950° C. at various heating rates shown in Table 2 in an atmosphere of 50% $N_2$ and 50% Ar and was then held at 950° C. for 30 hours, thereby performing final finish annealing. The steel sheet processed by final finish annealing was coated with a coating solution composed of aluminum dichromate, an emulsified resin, and ethyleneglycol and was then baked at 300° C., thereby yielding a steel sheet product.

The magnetic flux densities of the steel sheet product were measured in the L direction and in the C direction. In addition, an EI core was formed of the steel sheet product by stamping, and the iron loss thereof was measured. Furthermore, crystalline orientations in the steel sheet product were measured in an area of 100 mm by 280 mm by X-ray diffraction in accordance with the Laue method. From the measurement results of the crystalline orientations, areal ratios of crystal grains which were inclined by 20° or less with respect to the cube orientation and to the Goss orientation were obtained. The results obtained are also shown in Table 2.

According to Table 2, significantly superior iron losses of EI cores of the sample Nos. 1 to 6 were obtained. In the sample Nos. 1 to 6, both magnetic flux densities $B_{50}$ in the rolling direction (L direction) and in the direction perpendicular thereto (C direction) were 1.70 T or more, and the ratio of the magnetic flux density $B_{50}(L)$/in $B_{50}(C)$ met the range of 1.005 to 1.100. In addition, in the sample Nos. 1 to 6, the areal ratio of the crystalline grains inclined by 20° or less with respect to the cube orientation was 50 to 80%, and the areal ratio of the crystalline grains inclined by 20° or less with respect to the Goss orientation was 6 to 20%.

Example 2

A steel slab was formed by continuous casting which was composed of 0.022 wt % C, 3.3 wt % Si, 0.52 wt % Mn, 0,0050 wt % Al, 5 ppm Se, 5 ppm S, 15 ppm O, 10 ppm N, and balance essentially Fe. The steel slab was heated to 1,200° C. for 20 minutes and was then hot-rolled to form a hot-rolled steel sheet 3.2 mm thick. The hot-rolled steel sheet was processed by annealing for a hot-rolled steel sheet at a temperature of 1,050° C. for 20 seconds. The hot-rolled steel sheet was cold-rolled at room temperature so as to have an intermediate thickness of 1.5 mm and was then processed by intermediate annealing at 1,000° C. for 30 seconds. Subsequently, by cold rolling at room temperature, a cold-rolled steel sheet having a final thickness of 0.28 mm was formed. Recrystallization annealing was performed for the cold-rolled steel sheet thus formed at a constant temperature of 850° C. for 30 seconds in an atmosphere of 75 vol % hydrogen and 25 vol % nitrogen, in which the dew point was 40° C., thereby decreasing the content of C to 10 ppm. The steel sheets processed by recrystallization annealing was heated to 750° C. at a heating rate of 70° C./hour and to a range of 750 to 820° C. at a heating rate of 10° C./hour in an Ar atmosphere and was then held at 820° C. for 100 hours, thereby performing final finish annealing. The steel sheet processed by final finish annealing was coated with a coating solution composed of aluminum dichromate, an emulsified resin, and ethyleneglycol and was then baked at 300° C., thereby yielding a steel sheet product. Measurements equivalent to those in Example 1 were performed for the steel sheet product. The results are shown in Table 3.

As shown in Table 3, according to the present invention, a most preferable electrical steel sheet could be obtained as a material used for an EI core, in which both magnetic flux densities $B_{50}$ in the L direction and in the C direction were 1.70 T or more, and the $B_{50}(L)/B_{50}(C)$ met the range of 1.005 to 1.100.

In addition, in the texture of the electrical steel sheet described above, the areal ratio of the crystalline grains inclined by 20° or less with respect to the cube orientation ({100}<001>) met a range of 50 to 80%, and the areal ratio of the crystalline grains inclined by 20° or less with respect to the Goss orientation ({110}<001>) met a range of 6 to 20%.

Example 3

Steel slabs having various compositions shown in Table 4 were heated to 1,160° C. and were then hot-rolled, thereby yielding hot-rolled steel sheets 2.8 mm thick. The hot-rolled steel sheets were processed by annealing for a hot-rolled steel sheet at a constant temperature of 1,100° C. for 60 seconds and were then cold-rolled at 250° C., thereby yielding cold-rolled steel sheets having a final thickness of 0.50 mm. Recrystallization annealing, which was also annealing for decarburization, was performed for cold-rolled steel sheets at a constant temperature of 900° C. for 20 seconds in an atmosphere of 75 vol % hydrogen and 25 vol % nitrogen, in which the dew point thereof is 35° C., thereby decreasing the contents of C in the steel sheets to 20 ppm. The steel sheets processed by recrystallization annealing were heated at a heating rate of 2.5° C./hour in a range of 750 to 950° C. and were held at 950° C., thereby performing final finish annealing. The steel sheets processed by final finish annealing were coated with a coating solution composed of aluminum phosphate, potassium dichromate, and boric acid and was then baked at 300° C., thereby yielding steel sheet products. Measurements equivalent to those in Example 1 were performed for the steel sheet products. The results are shown in Table 5.

As shown in Table 5, the sample Nos. 1 to 8 had compositions within the range according to the present invention and met the appropriate ranges of the magnetic flux densities in both the L direction and the C direction and the ratio of $B_{50}$(L)/in $B_{50}$(C), whereby superior iron losses could be obtained for EI cores of the sample Nos. 1 to 8.

Example 4

Steel slabs having various compositions shown in Table 6 were formed by continuous casting. The steel slabs were formed into hot-rolled steel sheets 2.6 mm thick by hot rolling after heating to 1,100° C. for 20 minutes. The hot-rolled steel sheets were processed by annealing for a hot-rolled steel sheet at a temperature of 1,100° C. for 60 seconds and were then warm-rolled, thereby yielding warm-rolled steel sheets having a final thickness of 0.35 mm. Recrystallization annealing was performed for warm-rolled steel sheets at a temperature of 900° C. in an atmosphere of 50 vol % nitrogen and 50 vol % hydrogen, and final finish annealing was then performed, thereby yielding steel sheets products.

The magnetic flux densities $B_{50}$ in the L direction and in the C direction of the steel sheet products thus formed were measured. In addition, the areal ratios of the crystal grains inclined by 15° or less with respect to the {100}<001> orientation of the steel sheet products were measured by X-ray diffraction in accordance with the Laue method. Furthermore, the magnetostrictions in the rolling direction and in the direction perpendicular thereto were also measured using a laser Doppler method.

In addition, the steel sheet products were stamped into ring-shape steel sheets 150 mm in diameter, and the ring-shape steel sheets were processed by stress-relief annealing for at 750° C. for 2 hours. The steel sheets thus annealed were laminated with each other so as to form iron cores, and noise generated thereby was measured. The noise measurement was performed, in which the iron core was magnetized to a magnetic flux density of 1.5 T at 50 Hz of an alternating current, and the noise was measured by a microphone disposed at a position 100 mm over the iron core. The results obtained are shown in Table 6.

As shown in Table 6, in the steel sheet products which were formed of steel slab Nos. 1 to 4 having the compositions according to the present invention and were processed by appropriate recrystallization annealing, the magnetic properties, magnetostriction properties, and anti-noise properties were superior.

Example 5

A steel slab was formed by continuous casting, which was composed of 220 ppm C, 3.25 wt % Si, 0.16 wt % Mn, 80 ppm Al, 12 ppm Se, 11 ppm S, 9 ppm N, 13 ppm O, and substantial Fe as the balance, in which an inhibitor was not contained. The steel slab was heated to 1,100° C. for 20 minutes and was hot-rolled to form a hot-rolled steel sheet having a desired thickness. The hot-rolled steel sheet was processed by annealing for a hot-rolled steel sheet and was then warm-rolled, thereby yielding a warm-rolled steel sheet having a final thickness of 0.35 mm. Recrystallization annealing was performed for the warm-rolled steel sheet thus formed at various conditions shown in Table 7, and subsequently, final finish annealing was performed in a nitrogen atmosphere, thereby yielding steel sheet products. Measurements equivalent to those described in Example 4 were performed for the steel sheet products thus formed. The results obtained are shown in Table 7.

As can be seen in Table 7, the products of the sample Nos. 4 to 6, 8 to 12, 14, and 15 had superior magnetic properties, magnetostriction properties, and anti-noise properties, which were processed by recrystallization annealing at a temperature of 800 to 1,000° C. in an atmosphere in which the ratio of nitrogen was 5 vol % or more.

Example 6

A steel slab was formed by continuous casting which was composed of 3.1 wt % Si, 0.012 wt % C, 0.1 wt % Mn, 0.009 wt % Al, 10 ppm N, 13 ppm O, 5 ppm S, 4 ppm Se, and substantially Fe as the balance. The steel slab was hot-rolled to form a hot-rolled steel sheet 2.7 mm thick. The hot-rolled steel sheet was processed by annealing for a hot-rolled steel sheet at a constant temperature of 1,140° C. for 60 seconds and was then cold-rolled at 270° C., thereby yielding a cold-rolled steel sheet having a final thickness of 0.35 mm. The average diameter of grains before the final cold rolling was 280 $\mu$m. Recrystallization annealing was performed for the cold-rolled steel sheet thus formed at a constant temperature of 920° C. for 30 seconds in an atmosphere of 40 vol % hydrogen and 60 vol % nitrogen, in which the dew point was 50° C., thereby decreasing the content of C in the steel sheet to 0.002 wt %. Subsequently, a separator for annealing composed of powdered silica and powdered alumina at a ratio of 3 to 1 was coated by electrostatic coating on the surface of the steel sheet processed by recrystallization annealing, and the steel sheet was coiled and was then processed by final finish annealing. Finish annealing was performed in which a temperature was increased for 5 hours from room temperature to 800° C., was increased for 25 hours from 800 to 950° C., was maintained at 950° C. for 36 hours, and was then cooled in the furnace. In this step, an amount of moisture introduced into the atmosphere in the furnace was variously changed, whereby an amount of oxide formed on the surface of the steel sheet was controlled. After the separation agent for annealing was removed by washing from the steel sheet processed by finish annealing, annealing for flattening was performed at 840° C. for 60 seconds in an atmosphere of 5 vol % $H_2$ and 95 vol % $N_2$, while tensile force was applied to the steel sheet. On the surface of the steel sheet processed by annealing for flattening, a semi-organic coating was formed at a thickness of 1.0 $\mu$m, which was an inorganic component composed of magnesium dichromate and boric acid mixed with an organic resin. By the steps described above, an electrical steel sheet was obtained which was composed of secondary recrystallized grains approximately 20 mm in diameter integrated in the cube orientations.

The magnetic flux densities $B_{50}$ in the L direction and in the C direction of the steel sheet products thus formed were measured. Next, EI-48 type EI core samples were manufactured by stamping the steel sheets, and the iron losses thereof at 1.5 T magnetized by an alternating current of 50 Hz. The results of the iron losses together with amounts of the oxide on the surface of the steel sheet are shown in Table B. As shown in Table 8, the sample Nos. 1 to 3, in which the amounts of the oxide were controlled to be 1.0 g/$m^2$ or less, had superior iron losses of the EI cores, and degradation of the properties thereof after fabrication was suppressed.

Example 7

A steel sheet composed of secondary recrystallized grains having an oxide on the surface thereof in an amount of 0.4 g/$m^2$ as an amount of oxygen was formed in a manner equivalent to that in Example 6. The steel sheet described above was coated with an inorganic coating. The inorganic coating was formed by baking a solution at 800° C., composed of aluminum phosphate, potassium chromate, and boric acid mixed with colloidal silica, thereby yielding a film 1 μm thick. When the content of the colloidal silica was increased, the coefficient of thermal expansion of the coating was decreased, and hence, tensile force imparted to the steel sheet was increased. The magnetostriction of the steel sheet was measured while compressive stress of 0 to 6 MPa was applied thereto, and the compressive stress at which the magnetostriction was rapidly increased was determined to be tensile force imparted to the steel sheet.

The results of the steel sheet are shown in Table 9, which are magnetic flux densities measured in the L direction and in the C direction and iron losses in the L direction and in the C direction magnetized to 1.5 T by an alternating current of 50 Hz in accordance with the Epstein test.

As can be seen in Table 9, when the tensile force imparted to the steel sheet exceeded 5 MPa, it was not preferable since the iron loss in the C direction was largely increased. On the other hand, when the tensile strength was 5 MPa or less, and more particularly, 3 MPa or less, the iron loss in the C direction was significantly decreased, and hence, a preferable iron loss properties could be obtained.

In addition, a coating baked at 350° C. having no colloidal silica therein and the semi-organic coating used in Example 6 had nearly no tensile force imparted to the steel sheet. Accordingly, the iron losses were superior after the coating was formed, in which 1.22 W/kg in the L direction and 1.45 W/kg in the C direction were obtained as an average value in respective directions.

Example 8

Steel slabs having compositions shown in Table 10 were formed into electrical steel sheets 0.35 mm thick by hot rolling, annealing for a hot-rolled steel sheet, cold rolling, recrystallization annealing, and finish annealing at various conditions. The steel sheets processed by finish annealing were processed by annealing for flattening and by insulating coating treatment.

The iron losses of the steel sheets described above magnetized to 1.5 T by an alternating current of 50 Hz were measured in accordance with the Epstein test. In this measurement, a half number of Epstein samples was used which were cut away in each direction, i.e., the L direction and the C direction, from the steel sheet. Among samples obtained from the same composition by various conditions, the measurement result of the sample having the lowest iron loss is shown in Table 10. In addition, the magnetic flux densities $B_{50}$ in the L direction and in the C direction of the sample described above are shown in Table 10.

As can be seen in Table 10, the sample Nos. 1 to 5, which had the compositions according to the present invention, exhibited superior iron losses. On the other hand, the iron losses of the samples, in which one of C, Mn, Al, S, Se, O, and N was out of the appropriate range according to the present invention, were increased, and hence, the samples described above were not suitable for iron core materials.

Example 9

A starting temperature of secondary recrystallization was measured by only changing the content of Al based on the composition of the sample No. 1 in Table 10. Samples 400 mm long and 50 mm wide were cut away from the steel sheets processed by recrystallization annealing. The samples were put in an electric furnace having a temperature difference of 800 to 1,200° C. and were held for 50 hours. After that, the starting temperature of secondary recrystallization was evaluated by corresponding the presence of secondary recrystallization, detected by macro etching, with temperatures. The results obtained are shown in Table 11.

As shown in Table 11, when the content of Al was set to be 0.02 wt % or less, secondary recrystallization occurred. In particular, when the content of Al was less than 0.01 wt %, the starting temperature of secondary recrystallization was decreased, and hence, finish annealing at a lower temperature can be performed Accordingly, when the content of Al was controlled to be less than 0.01 wt %, it is significantly advantageous to the reduction in amount of oxide formed on the surface of the steel sheet.

In Examples 1 to 3, the cases, in which EI cores are formed, are described as an application of the electrical steel sheet of the present invention; however, the application of the present invention is not limited to compact transformers, such as EI cores.

Since the electrical steel sheet of the present invention has significantly superior magnetic properties in both the rolling direction and the direction perpendicular thereto, compared to those of a non-oriented silicon steel sheet, high efficiency can be obtained when the electrical steel sheet of the present invention is applied to common motors.

In addition, compared to the doubly oriented silicon steel sheets manufactured by conventional techniques, the steel sheet of the present invention can be manufactured from the starting material containing no inhibitor, and cross rolling is not required in the manufacturing process therefor. Accordingly, even though the steel sheet of the present invention has slightly inferior magnetic properties than those of the conventional doubly oriented silicon steel sheet, there is a significant advantage in that mass production can be performed at a lower cost.

The electrical steel sheet according to the present invention has smaller anisotropy of magnetic properties compared to that of a conventional singly oriented or a doubly oriented silicon steel sheet. Accordingly, the electrical steel sheet of the present invention is most preferably used as iron core materials for use in compact motors and electric generators in which direction of magnetic flux largely changes inside the core.

In addition, by improving magnetic properties not only in the rolling direction but also in the direction perpendicular thereto, an electrical steel sheet having superior anti-noise properties can be obtained. Furthermore, by suppressing an amount of an oxide formed on the surface of the steel sheet to be 1.0 $g/m^2$ or less as an amount of oxygen, an electrical steel sheet can be obtained in which degradation of properties thereof caused by fabrication is small.

While the present invention has been described above in connection with several preferred embodiments, it is to be expressly understood that those embodiments are solely for illustrating the invention, and are not to be construed in a limiting sense. After reading this disclosure, those skilled in this art will readily envision insubstantial modifications and substitutions of equivalent materials and techniques, and all such modifications and substitutions are considered to fall within the true scope of the appended claims.

TABLE 1

| No. | Annealing temperature (° C.) | Ratio of nitrogen (vol %) | Sum of magnetostrictions in rolling direction and the direction perpendicular thereto: $\lambda_{p-p}$ ($\times 10^{-6}$) | areal ratio of the grains inclined by 15° or less with respect to the (100) <001> orientation (%) |
|---|---|---|---|---|
| 1 | 800 | 25 | 7.9 | 43.1 |
| 2 | 800 | 100 | 7.5 | 32.7 |
| 3 | 850 | 50 | 6.8 | 46.8 |
| 4 | 850 | 100 | 7.0 | 39.5 |
| 5 | 900 | 5 | 6.8 | 50.1 |
| 6 | 900 | 50 | 5.2 | 68.2 |
| 7 | 900 | 80 | 6.1 | 65.3 |
| 8 | 900 | 100 | 5.9 | 60.2 |
| 9 | 950 | 50 | 5.8 | 62.4 |
| 10 | 950 | 100 | 6.3 | 58.5 |
| 11 | 1000 | 50 | 7.2 | 53.1 |
| 12 | 1000 | 100 | 7.5 | 35.4 |

TABLE 2

| No. | Annealing temperature for hot-rolled steel sheet (° C.) | Heating rate for final finish annealing (° C./h) | Magnetic flux density in L direction: $B_{50}$ (T) | Magnetic flux density in C direction: $B_{50}$ (T) | Ratio of magnetic flux density: $B_{50}$ (L)/$B_{50}$ (C) | Areal ratio of cube grains (%) | Areal ratio of Goss grains (%) | Iron loss of EI core: $W_{15/50}$ (W/kg) | Remarks |
|---|---|---|---|---|---|---|---|---|---|
| 1 | 975 | 10 | 1.903 | 1.878 | 1.013 | 71 | 13 | 1.85 | Inventive Example |
| 2 | 1075 | 10 | 1.923 | 1.874 | 1.026 | 75 | 11 | 1.82 | Inventive Example |
| 3 | 1125 | 10 | 1.914 | 1.854 | 1.032 | 72 | 9 | 1.86 | Inventive Example |
| 4 | 1175 | 10 | 1.923 | 1.874 | 1.026 | 75 | 11 | 1.82 | Inventive Example |
| 5 | 1100 | 2.5 | 1.933 | 1.904 | 1.015 | 77 | 15 | 1.78 | Inventive Example |
| 6 | 1100 | 15 | 1.893 | 1.871 | 1.012 | 68 | 11 | 1.87 | Inventive Example |
| 7 | 700 | 5 | 1.863 | 1.612 | 1.156 | 25 | 45 | 2.45 | Comparative Example |
| 8 | 1250 | 5 | 1.833 | 1.674 | 1.094 | 35 | 3 | 2.32 | Comparative Example |
| 9 | 1100 | 50 | 1.883 | 1.685 | 1.117 | 22 | 41 | 2.30 | Comparative Example |

TABLE 3

| Magnetic flux density in L direction: $B_{50}$ (T) | Magnetic flux density in C direction: $B_{50}$ (T) | Ratio of magnetic flux density: $B_{50}$ (L)/$B_{50}$ (C) | Areal ratio of cube grains (%) | Areal ratio of Goss grains (%) | Iron loss of EI core: $W_{15/50}$ (W/kg) | Remarks |
|---|---|---|---|---|---|---|
| 1.913 | 1.870 | 1.023 | 75 | 11 | 1.95 | Inventive Example |

TABLE 4

| No. | C (wt %) | Si (wt %) | Mn (wt %) | Ni (wt %) | Sn (wt %) | Sb (wt %) | Cu (wt %) | Mo (wt %) | Cr (wt %) | O (ppm) | N (ppm) | Al (ppm) | Se (ppm) | S (ppm) |
|---|---|---|---|---|---|---|---|---|---|---|---|---|---|---|
| 1 | 0.043 | 3.35 | 0.15 | 0.50 | tr | tr | tr | tr | tr | 13 | 8 | 50 | 5 | 15 |
| 2 | 0.028 | 3.20 | 0.11 | 0.25 | tr | tr | tr | tr | tr | 15 | 14 | 90 | 3 | 9 |

TABLE 4-continued

| No. | C (wt %) | Si (wt %) | Mn (wt %) | Ni (wt %) | Sn (wt %) | Sb (wt %) | Cu (wt %) | Mo (wt %) | Cr (wt %) | O (ppm) | N (ppm) | Al (ppm) | Se (ppm) | S (ppm) |
|---|---|---|---|---|---|---|---|---|---|---|---|---|---|---|
| 3 | 0.011 | 3.24 | 0.10 | tr | tr | tr | tr | tr | tr | 11 | 12 | 160 | 4 | 7 |
| 4 | 0.053 | 3.43 | 0.35 | tr | 0.10 | tr | tr | tr | tr | 11 | 13 | 70 | 3 | 23 |
| 5 | 0.005 | 3.15 | 0.03 | tr | tr | 0.03 | tr | tr | tr | 10 | 10 | 20 | 2 | 8 |
| 6 | 0.032 | 3.25 | 0.50 | tr | tr | tr | 0.20 | tr | tr | 18 | 18 | 30 | 5 | 19 |
| 7 | 0.040 | 3.59 | 0.35 | tr | tr | tr | tr | 0.05 | tr | 11 | 7 | 90 | 6 | 16 |
| 8 | 0.063 | 3.30 | 0.05 | tr | tr | tr | tr | tr | 0.30 | 9 | 17 | 40 | 17 | 15 |
| 9 | 0.001 | 3.30 | 0.21 | tr | tr | tr | tr | tr | tr | 10 | 21 | 105 | 3 | 14 |
| 10 | 0.150 | 3.10 | 0.34 | tr | tr | tr | tr | tr | tr | 17 | 11 | 50 | 5 | 9 |
| 11 | 0.025 | 3.35 | 3.05 | tr | tr | tr | tr | tr | tr | 15 | 22 | 20 | 3 | 16 |
| 12 | 0.040 | 3.33 | 0.12 | tr | tr | tr | tr | tr | tr | 10 | 10 | 340 | 3 | 11 |
| 13 | 0.033 | 3.20 | 0.19 | tr | tr | tr | tr | tr | tr | 60 | 14 | 20 | 5 | 10 |
| 14 | 0.015 | 3.39 | 0.14 | tr | tr | tr | tr | tr | tr | 15 | 65 | 30 | 4 | 9 |
| 15 | 0.035 | 3.40 | 0.15 | tr | tr | tr | tr | tr | tr | 8 | 10 | 40 | 90 | 8 |
| 16 | 0.050 | 3.20 | 0.22 | tr | tr | tr | tr | tr | tr | 6 | 13 | 50 | 4 | 110 |

TABLE 5

| No. | Magnetic flux density in L direction: $B_{50}$ (L) (T) | Magnetic flux density in C direction: $B_{50}$ (C) (T) | Ratio of magnetic flux density: $B_{50}$ (L)/$B_{50}$ (C) | Areal ratio of cube grains (%) | Areal ratio of Goss grains (%) | Iron loss of EI core: $W_{15/50}$ (W/kg) | Remarks |
|---|---|---|---|---|---|---|---|
| 1 | 1.907 | 1.845 | 1.034 | 70 | 10 | 1.50 | Inventive Example |
| 2 | 1.902 | 1.871 | 1.017 | 76 | 14 | 1.44 | Inventive Example |
| 3 | 1.886 | 1.854 | 1.017 | 65 | 8 | 1.56 | Inventive Example |
| 4 | 1.856 | 1.833 | 1.013 | 63 | 11 | 1.45 | Inventive Example |
| 5 | 1.900 | 1.883 | 1.009 | 77 | 7 | 1.50 | Inventive Example |
| 6 | 1.878 | 1.848 | 1.016 | 66 | 13 | 1.48 | Inventive Example |
| 7 | 1.865 | 1.824 | 1.022 | 65 | 8 | 1.52 | Inventive Example |
| 8 | 1.858 | 1.828 | 1.016 | 55 | 10 | 1.48 | Inventive Example |
| 9 | 1.802 | 1.632 | 1.105 | 33 | 18 | 2.33 | Inventive Example |
| 10 | 1.788 | 1.603 | 1.154 | 23 | 10 | 2.45 | Comparative Example |
| 11 | 1.698 | 1.655 | 1.026 | 33 | 5 | 2.41 | Comparative Example |
| 12 | 1.733 | 1.654 | 1.048 | (Secondary recrystallization) defect) | | 2.75 | Comparative Example |
| 13 | 1.666 | 1.604 | 1.039 | (Secondary recrystallization) defect) | | 2.85 | Comparative Example |
| 14 | 1.709 | 1.601 | 1.067 | (Secondary recrystallization) defect) | | 2.75 | Comparative Example |
| 15 | 1.701 | 1.621 | 1.049 | (Secondary recrystallization) defect) | | 2.83 | Comparative Example |
| 16 | 1.698 | 1.631 | 1.041 | (Secondary recrystallization) defect) | | 2.80 | Comparative Example |

TABLE 6

| No. | C (wt %) | Si (wt %) | Mn (wt %) | Al (ppm) | Se (ppm) | S (ppm) | O (ppm) | N (ppm) | B50 (L) (T) | B50 (C) (T) | B50 (L)/ B50 (C) | Areal ratio of grains inclined by 15° or less with respect to the {100} <001> orientation (%) | Sum of magneto-striction in rolling direction and in the direction perpendicular thereto ($\lambda_{p\text{-}p}$: × $10^{-6}$) | Noise (dB) |
|---|---|---|---|---|---|---|---|---|---|---|---|---|---|---|
| 1 | 0.023 | 3.14 | 0.15 | 80 | 11 | 11 | 20 | 7 | 1.91 | 1.83 | 1.044 | 51.5 | 7.5 | 38.4 |
| 2 | 0.032 | 3.21 | 0.55 | 20 | 8 | 12 | 17 | 9 | 1.90 | 1.82 | 1.044 | 64.0 | 7.0 | 35.6 |
| 3 | 0.024 | 3.29 | 0.10 | 60 | 11 | 8 | 13 | 18 | 1.90 | 1.81 | 1.050 | 48.7 | 7.7 | 37.7 |
| 4 | 0.018 | 3.10 | 0.30 | 130 | 12 | 7 | 11 | 12 | 1.91 | 1.84 | 1.038 | 65.8 | 5.0 | 33.9 |
| 5 | 0.120 | 3.30 | 0.03 | 110 | 8 | 12 | 13 | 12 | 1.92 | 1.59 | 1.208 | 8.3 | 10.4 | 52.1 |
| 6 | 0.010 | 3.25 | 0.12 | 500 | 5 | 7 | 12 | 10 | 1.92 | 1.63 | 1.178 | 16.4 | 12.4 | 46.1 |
| 7 | 0.019 | 3.22 | 0.20 | 20 | 130 | 10 | 9 | 11 | 1.94 | 1.58 | 1.228 | 3.5 | 13.8 | 55.0 |
| 8 | 0.022 | 3.21 | 0.09 | 30 | 9 | 65 | 15 | 14 | 1.93 | 1.60 | 1.206 | 6.7 | 15.6 | 53.2 |
| 9 | 0.030 | 3.19 | 0.10 | 20 | 10 | 5 | 55 | 14 | 1.92 | 1.61 | 1.193 | 12.1 | 13.8 | 51.6 |
| 10 | 0.022 | 3.24 | 0.28 | 90 | 7 | 11 | 15 | 78 | 1.91 | 1.63 | 1.172 | 13.5 | 10.4 | 47.6 |

TABLE 7

| No. | Annealing temperature (° C.) | Ratio of nitrogen (vol %) | B50 (L) (T) | B50 (C) (T) | B50 (L)/ B50 (C) | Areal ratio of cube grains (%) | Sum of magnetostrictions in rolling direction and the direction perpendicular thereto: $\lambda_{p\text{-}p}$ (× $10^{-5}$) | Noise (dB) |
|---|---|---|---|---|---|---|---|---|
| 1 | 700 | 50 | 1.79 | 1.73 | 1.035 | 3.6 | 15.6 | 51.7 |
| 2 | 750 | 50 | 1.82 | 1.76 | 1.034 | 9.1 | 13.8 | 52.4 |
| 3 | 800 | 0 | 1.83 | 1.75 | 1.046 | 5.2 | 12.9 | 48.6 |
| 4 | 800 | 50 | 1.91 | 1.82 | 1.049 | 45.6 | 7.7 | 39.7 |
| 5 | 800 | 80 | 1.91 | 1.81 | 1.055 | 47.2 | 6.8 | 37.6 |
| 6 | 850 | 50 | 1.92 | 1.85 | 1.038 | 60.3 | 6.5 | 36.9 |
| 7 | 900 | 0 | 1.78 | 1.73 | 1.029 | 7.5 | 9.0 | 46.2 |
| 8 | 900 | 25 | 1.92 | 1.86 | 1.032 | 52.3 | 7.1 | 38.1 |
| 9 | 900 | 50 | 1.93 | 1.87 | 1.032 | 68.4 | 5.0 | 34.5 |
| 10 | 900 | 80 | 1.93 | 1.87 | 1.032 | 61.2 | 6.2 | 36.0 |
| 11 | 900 | 100 | 1.93 | 1.88 | 1.027 | 62.3 | 7.1 | 34.0 |
| 12 | 950 | 50 | 1.92 | 1.84 | 1.043 | 65.6 | 6.8 | 37.7 |
| 13 | 1000 | 0 | 1.84 | 1.76 | 1.045 | 12.3 | 11.1 | 47.3 |
| 14 | 1000 | 50 | 1.90 | 1.82 | 1.044 | 69.6 | 7.0 | 38.3 |
| 15 | 1000 | 80 | 1.90 | 1.81 | 1.050 | 62.7 | 6.9 | 36.7 |
| 16 | 1050 | 50 | 1.79 | 1.72 | 1.041 | 21.3 | 14.4 | 52.1 |

TABLE 8

| No. | Amount of oxide (g/m$^2$) | B50 (L) (T) | B50 (C) (T) | B50 (L)/ B50 (C) | Iron loss: $W_{15/50}$ (W/kg) |
|---|---|---|---|---|---|
| 1 | 0.1 | 1.92 | 1.83 | 1.049 | 1.85 |
| 2 | 0.4 | 1.92 | 1.83 | 1.049 | 1.89 |
| 3 | 1.0 | 1.91 | 1.81 | 1.055 | 1.93 |
| 4 | 1.3 | 1.90 | 1.80 | 1.056 | 2.22 |
| 5 | 2.1 | 1.90 | 1.79 | 1.061 | 2.35 |

TABLE 9

| No. | Tensile force (MPa) | B50 (L) (T) | B50 (C) (T) | B50 (L)/ B50 (C) | Iron loss in L direction: $W_{15/50}$ (L) (W/kg) | Iron loss in C direction: $W_{15/50}$ (C) (W/kg) |
|---|---|---|---|---|---|---|
| 1 | 0.7 | 1.93 | 1.85 | 1.043 | 1.24 | 1.43 |
| 2 | 1.1 | 1.93 | 1.85 | 1.043 | 1.23 | 1.44 |
| 3 | 2.2 | 1.94 | 1.85 | 1.049 | 1.20 | 1.46 |
| 4 | 3.0 | 1.94 | 1.83 | 1.060 | 1.18 | 1.51 |
| 5 | 3.7 | 1.95 | 1.82 | 1.071 | 1.10 | 1.65 |
| 6 | 4.8 | 1.95 | 1.80 | 1.083 | 1.00 | 1.81 |
| 7 | 5.2 | 1.95 | 1.77 | 1.102 | 0.99 | 2.15 |
| 8 | 6.4 | 1.95 | 1.75 | 1.114 | 0.92 | 2.63 |

TABLE 10

| No. | Si (wt %) | C (wt %) | Mn (wt %) | Al (wt %) | S (ppm) | Se (ppm) | O (ppm) | N (ppm) | B50 (L) (T) | B50 (C) (T) | B50 (L)/ B50 (C) | Iron loss: $W_{15/50}$ (W/kg) |
|---|---|---|---|---|---|---|---|---|---|---|---|---|
| 1 | 3.1 | 0.012 | 0.10 | 0.009 | 5 | 4 | 13 | 10 | 1.92 | 1.83 | 1.049 | 1.35 |
| 2 | 3.2 | 0.004 | 0.10 | 0.008 | 4 | 4 | 15 | 12 | 1.92 | 1.78 | 1.079 | 1.42 |
| 3 | 3.2 | 0.075 | 0.09 | 0.007 | 6 | 3 | 14 | 11 | 1.94 | 1.77 | 1.096 | 1.44 |
| 4 | 3.1 | 0.010 | 0.11 | 0.018 | 3 | 8 | 12 | 10 | 1.92 | 1.82 | 1.055 | 1.49 |
| 5 | 3.1 | 0.012 | 2.80 | 0.005 | 8 | 6 | 16 | 11 | 1.90 | 1.81 | 1.050 | 1.39 |
| 6 | 3.2 | 0.090 | 0.10 | 0.009 | 6 | 3 | 12 | 10 | 1.98 | 1.58 | 1.253 | 1.82 |
| 7 | 3.1 | 0.011 | 3.40 | 0.008 | 6 | 6 | 14 | 11 | 1.77 | 1.73 | 1.023 | 2.53 |
| 8 | 3.1 | 0.012 | 0.11 | 0.024 | 6 | 6 | 14 | 11 | 1.76 | 1.72 | 1.023 | 2.34 |
| 9 | 3.2 | 0.012 | 0.10 | 0.009 | 34 | 2 | 14 | 10 | 1.81 | 1.73 | 1.046 | 1.93 |
| 10 | 3.3 | 0.009 | 0.11 | 0.007 | 7 | 35 | 12 | 15 | 1.75 | 1.69 | 1.036 | 1.89 |
| 11 | 3.3 | 0.010 | 0.10 | 0.009 | 6 | 4 | 37 | 13 | 1.73 | 1.69 | 1.024 | 1.88 |
| 12 | 3.1 | 0.014 | 0.10 | 0.007 | 7 | 5 | 12 | 33 | 1.83 | 1.76 | 1.040 | 2.13 |

TABLE 11

| No. | Content of Al (wt %) | B50 (L) (T) | B50 (C) (T) | B50 (L)/ B50 (C) | Starting temperature for secondary recrystallization (° C.) |
|---|---|---|---|---|---|
| 1 | 0.002 | 1.92 | 1.83 | 1.049 | 825 |
| 2 | 0.005 | 1.91 | 1.80 | 1.061 | 835 |
| 3 | 0.007 | 1.91 | 1.81 | 1.055 | 845 |
| 4 | 0.009 | 1.93 | 1.82 | 1.060 | 853 |
| 5 | 0.010 | 1.93 | 1.81 | 1.066 | 925 |
| 6 | 0.018 | 1.90 | 1.79 | 1.061 | 973 |
| 7 | 0.024 | 1.79 | 1.71 | 1.047 | No secondary recrystallization |

What is claimed is:

1. An electrical steel sheet comprising from about 2.0 to about 8.0 wt % silicon, from about 0.005 to about 3.0 wt % manganese, from about 0.0010 to about 0.020 wt % aluminum, balance essentially iron;

wherein said steel sheet has a magnetic flux density $B_{50}$(L) in a rolling direction and a magnetic flux density $B_{50}$(C) in a direction perpendicular to the rolling direction of at least about 1.70 T, and wherein a ratio of $B_{50}(L)/B_{50}(C)$ is from about 1.005 to about 1.100.

2. The electrical steel sheet according to claim 1, wherein secondary recrystallized grains inclined by 20° or less with respect to the {100}<001> orientation are present in the steel sheet at an areal ratio of from about 50 to about 80%, and secondary recrystallized grains inclined by 20° or less with respect to the {110}<001> orientation are present in the steel sheet at an areal ratio of from about 6 to about 20%.

3. The electrical steel sheet according to claim 1, further comprising at least one member selected from the group consisting of from about 0.01 to about 1.50 wt % nickel, from about 0.01 to about 1.50 wt % tin, from about 0.005 to about 0.50 wt % antimony, from about 0.01 to about 1.50 wt % copper, from about 0.005 to about 0.50 wt % molybdenum, and from about 0.01 to about 1.50 wt % chromium.

4. The electrical steel sheet according to claim 2, further comprising at least one member selected from the group consisting of from about 0.01 to about 1.50 wt % nickel, from about 0.01 to about 1.50 wt % tin, from about 0.005 to about 0.50 wt % antimony, from about 0.01 to about 1.50 wt % copper, from about 0.005 to about 0.50 wt % molybdenum, and from about 0.01 to about 1.50 wt % chromium.

5. The electrical steel sheet according to claim 1, wherein, when magnetized to 1.5 T by an alternating current at a frequency of 50 Hz, the sum of the magnetostriction in the rolling direction and the magnetostriction in the direction perpendicular thereto is $8\times10^{-6}$ or less.

6. The electrical steel sheet according to claim 5, wherein the secondary recrystallized grains inclined by 15° or less with respect to the {100}<001> orientation are present in the steel sheet at an areal ratio of from about 30 to about 70%.

7. The electrical steel sheet according to claim 1, wherein an amount of an oxide formed on the surface of the electrical steel sheet is controlled to be 1.0 g/m$^2$ or less on one surface thereof as an amount of oxygen apart from an insulating coating.

8. The electrical steel sheet according to claim 1, wherein tensile force of an oxide formed on the surface thereof and the insulating coating, which is imparted to the electrical steel sheet, is at most about 5 MPa.

9. The electrical steel sheet according to claim 5, wherein tensile force of an oxide formed on the surface thereof and the insulating coating, which is imparted to the electrical steel sheet, is at most about 5 MPa.

10. The electrical steel sheet according to claim 7, wherein tensile force of an oxide formed on the surface thereof and the insulating coating, which is imparted to the electrical steel sheet, is at most about 5 MPa.

11. A method for manufacturing an electrical steel sheet, comprising the steps of:

hot rolling a steel slab containing from about 0.003 to about 0.08 wt % carbon, from about 2.0 to about 8.0 wt % silicon, from about 0.005 to about 3.0 wt % manganese, from about 0.0010 to about 0.010 wt % aluminum and sulfur and selenium respectively at most about 30 ppm by weight;

optionally annealing the hot-rolled steel sheet at a temperature of from about 950 to about 1,200° C.;

cold rolling the hot-rolled or annealed steel sheet at least once, wherein if cold rolling is performed plural times, an intermediate annealing is performed between successive cold rollings;

recrystallization annealing the cold-rolled steel sheet;

optionally coating a separator for annealing on the steel sheet processed by the recrystallization annealing step;

final finish annealing the steel sheet processed by the recrystallization annealing to a temperature of at least about 800° C.;

optionally flattening annealing the steel sheet processed by the final finish annealing; and forming an insulating coating on the steel sheet.

12. The method according to claim 11, wherein the contents of nitrogen and oxygen are respectively controlled to be at most about 50 ppm by weight, as unavoidable impurities.

13. The method for manufacturing an electrical steel sheet according to claim 11, wherein the average heating rate is set to be 30° C./hour or less above 750° C. in the final finish annealing step.

14. The method for manufacturing an electrical steel sheet according to claim 12, wherein the average heating rate is set to be 30° C./hour or less above 750° C. in the final finish annealing step.

15. The method for manufacturing an electrical steel sheet according to claim 11, wherein the steel slab further comprises at least one member selected from the group consisting of from about 0.01 to about 1.50 wt % nickel, from about 0.01 to about 1.50 wt % tin, from about 0.005 to about 0.50 wt % antimony, from about 0.01 to about 1.50 wt % copper, from about 0.005 to about 0.50 wt % molybdenum, and from about 0.01 to about 1.50 wt % chromium.

16. The method for manufacturing an electrical steel sheet according to claim 12, wherein the steel slab further comprises at least one member selected from the group consisting of from about 0.01 to about 1.50 wt % nickel, from about 0.01 to about 1.50 wt % tin, from about 0.005 to about 0.50 wt % antimony, from about 0.01 to about 1.50 wt % copper, from about 0.005 to about 0.50 wt % molybdenum, and from about 0.01 to about 1.50 wt % chromium.

17. The method for manufacturing an electrical steel sheet according to claim 13, wherein the steel slab further comprises at least one member selected from the group consisting of from about 0.01 to about 1.50 wt % nickel, from about 0.01 to about 1.50 wt % tin, from about 0.005 to about 0.50 wt % antimony, from about 0.01 to about 1.50 wt % copper, from about 0.005 to about 0.50 wt % molybdenum, and from about 0.01 to about 1.50 wt % chromium.

18. The method for manufacturing an electrical steel sheet according to claim 11, wherein the recrystallization annealing step is performed at a temperature of from about 800 to about 1,000° C. in an atmosphere in which a ratio of nitrogen is at least about 5 vol %.

19. The method for manufacturing an electrical steel sheet according to claim 11, wherein the average diameter of crystalline grains is set to be at least about 200 μm before a final cold rolling step, a reduction ratio in the final cold rolling step is set to be 60 to 90%, and the final finish annealing step is performed at about 1,100° C. or less in an atmosphere in which the dew point is set to be 10° C. or less, and a volume percentage of oxygen is set to be at most about 0.1%.

20. The method for manufacturing an electrical steel sheet according to claim 11, wherein the insulating coating is formed by coating one of an organic coating material at a thickness of 5 μm or less, a semi-organic coating material composed of an organic resin and an inorganic component at a thickness of 5 μm or less, and an inorganic glass coating material at a thickness of 2 μm or less.

21. The method for manufacturing an electrical steel sheet according to claim 12, wherein the recrystallization annealing step is performed at a temperature of from about 800 to about 1,000° C. in an atmosphere in which a ratio of nitrogen is at least about 5 vol %.

22. The method for manufacturing an electrical steel sheet according to claim 12, wherein the average diameter of crystalline grains is set to be at least about 200 μm before a final cold rolling step, a reduction ratio in the final cold rolling step is set to be 60 to 90%, and the final finish annealing step is performed at about 1,100° C. or less in an atmosphere in which the dew point is set to be 10° C. or less, and a volume percentage of oxygen is set to be at most about 0.1%.

23. The method for manufacturing an electrical steel sheet according to claim 12, wherein the insulating coating is formed by coating one of an organic coating material at a thickness of 5 μm or less, a semi-organic coating material composed of an organic resin and an inorganic component at a thickness of 5 μm or less, and an inorganic glass coating material at a thickness of 2 μm or less.

24. The method for manufacturing an electrical steel sheet according to claim 11, wherein the steel slab consists essentially of from about 0.003 to about 0.08 wt % carbon, from about 2.0 to about 8.0 wt % silicon, from about 0.005 to about 3.0 wt % manganese, from about 0.0010 to about 0.010 wt % aluminum, sulfur and selenium respectively at most about 30 ppm by weight and the balance of iron and unavoidable impurities.

* * * * *